(12) United States Patent
Kiko

(10) Patent No.: US 6,504,906 B1
(45) Date of Patent: Jan. 7, 2003

(54) TELEPHONE MICRO-TESTER AND TRANSPORT SYSTEM

(75) Inventor: Frederick J. Kiko, Carlsbad, CA (US)

(73) Assignee: Excelsus Technologies, Inc., Carlsbad, CA (US)

( * ) Notice: Subject to any disclaimer, the term of this patent is extended or adjusted under 35 U.S.C. 154(b) by 0 days.

(21) Appl. No.: 09/572,139

(22) Filed: May 16, 2000

(51) Int. Cl.[7] .................... H04M 1/24; H04M 3/08; H04M 3/22
(52) U.S. Cl. ............... 379/27.01; 379/1.01; 379/9.06; 379/22.04; 379/26.01; 379/27.07; 379/29.01
(58) Field of Search ............... 379/1.01, 1.03, 379/2, 9, 9.02, 9.06, 14, 12, 15.01, 15.02, 22, 22.03, 22.04, 26.01, 27.01, 27.05, 27.06, 27.08, 29.01, 29.02, 29.03, 29.04, 32.01

(56) References Cited

U.S. PATENT DOCUMENTS

| | | | | |
|---|---|---|---|---|
| 4,637,035 A | * | 1/1987 | Betts .......................... | 375/8 |
| 4,663,775 A | * | 5/1987 | Olek .......................... | 379/24 |
| 5,148,144 A | * | 9/1992 | Sutterlin et al. .......... | 340/310 |
| 5,400,321 A | * | 3/1995 | Nagato ........................ | 370/14 |
| 5,956,324 A | * | 9/1999 | Engdahl et al. ............. | 370/42 |
| 6,078,649 A | * | 6/2000 | Small et al. ................ | 379/39 |
| 6,304,633 B1 | * | 10/2001 | Adachi et al. ............. | 379/12 |

* cited by examiner

Primary Examiner—Melur Ramakrishnaiah
Assistant Examiner—Quoc Tran
(74) Attorney, Agent, or Firm—Davis Chin

(57) ABSTRACT

A telephone micro-tester and transport system for testing smaller remote SLC customer's lines and terminal equipment is provided. A micro-tester is located at a remote terminal for measuring and storing signatures of test performed on the SLC customer's lines and terminal equipment to determine faults. A first modem is located at the remote terminal and is coupled to the micro-tester for transferring the measured and stored signatures of the test performed to a second modem. The second modem is located at the telephone company's central office for receiving the measured and stored signatures of the tests performed which are being transferred by the first modem. A synthesizer is located at the telephone company's central office and is coupled to the second modem for re-creating virtual signatures of the test performed by the micro-tester at the remote terminal and for transporting the them to a test system at the telephone company's central office.

25 Claims, 13 Drawing Sheets

SIMPLIFIED BLOCK DIAGRAM FOR MICROTESTER

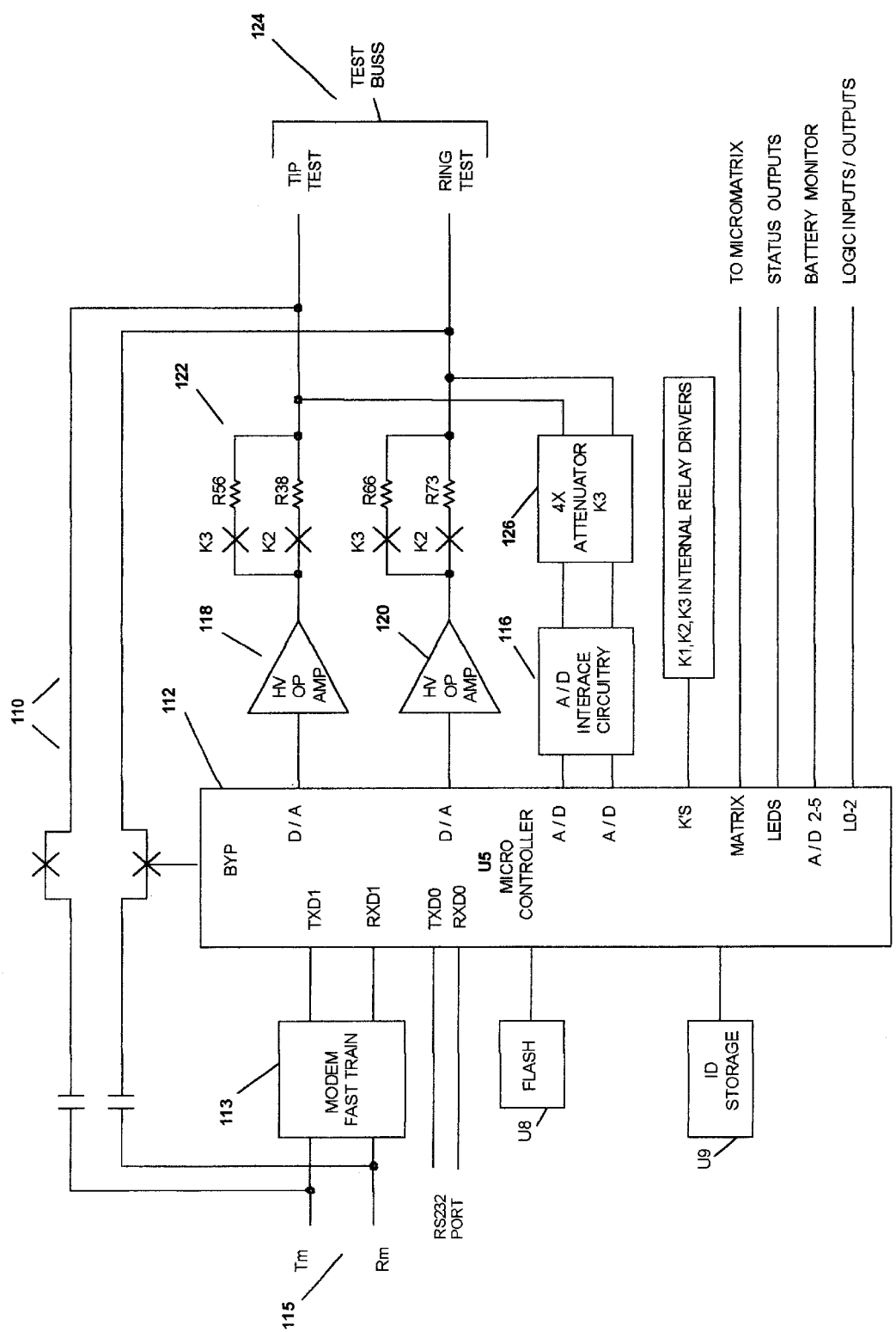
FIGURE 1 SIMPLIFIED BLOCK DIAGRAM FOR MICROTESTER

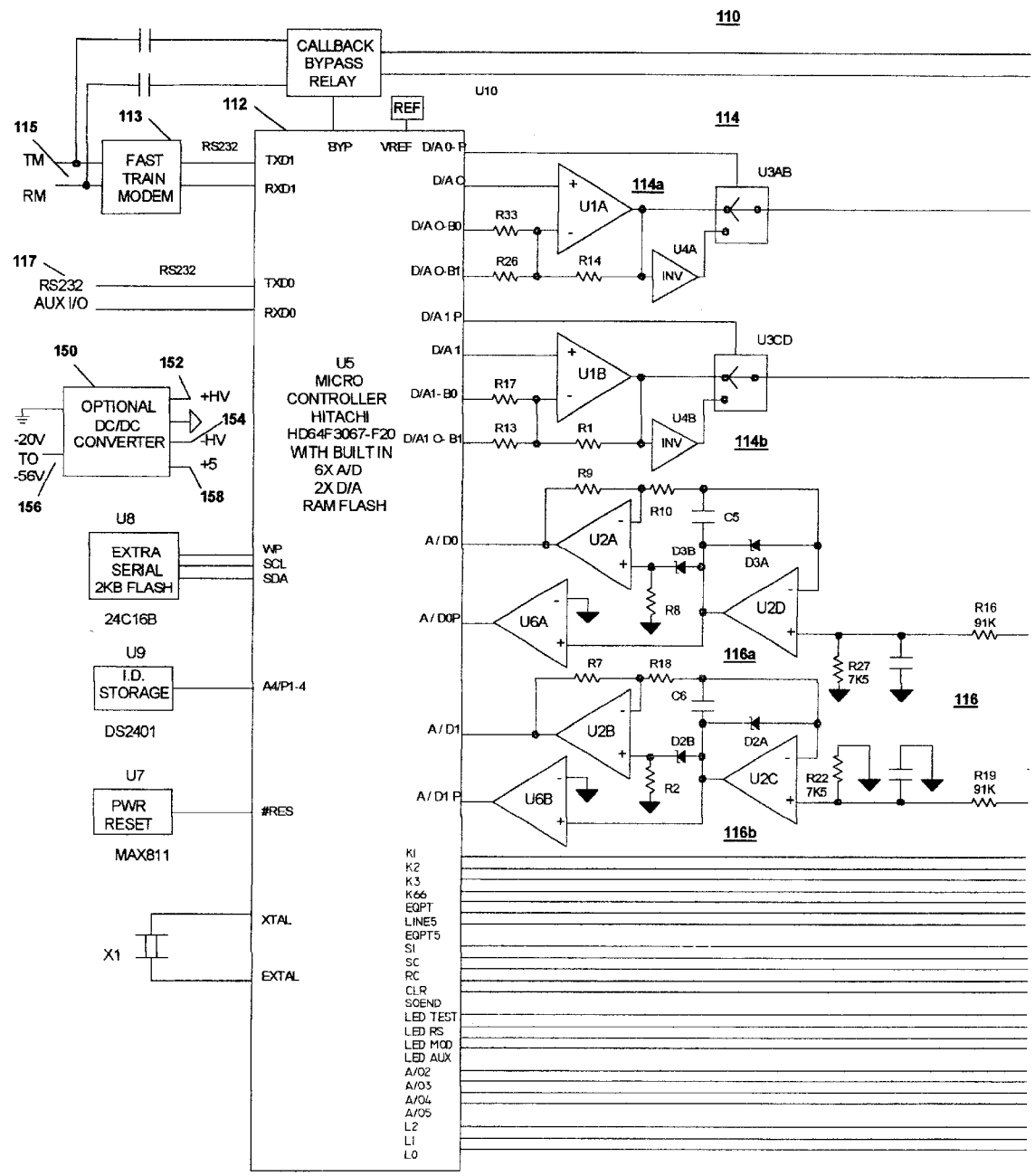
FIGURE 2A (1 OF 2)
DETAILED MICROTESTER / MICROMATRIX BLOCK DIAGRAM

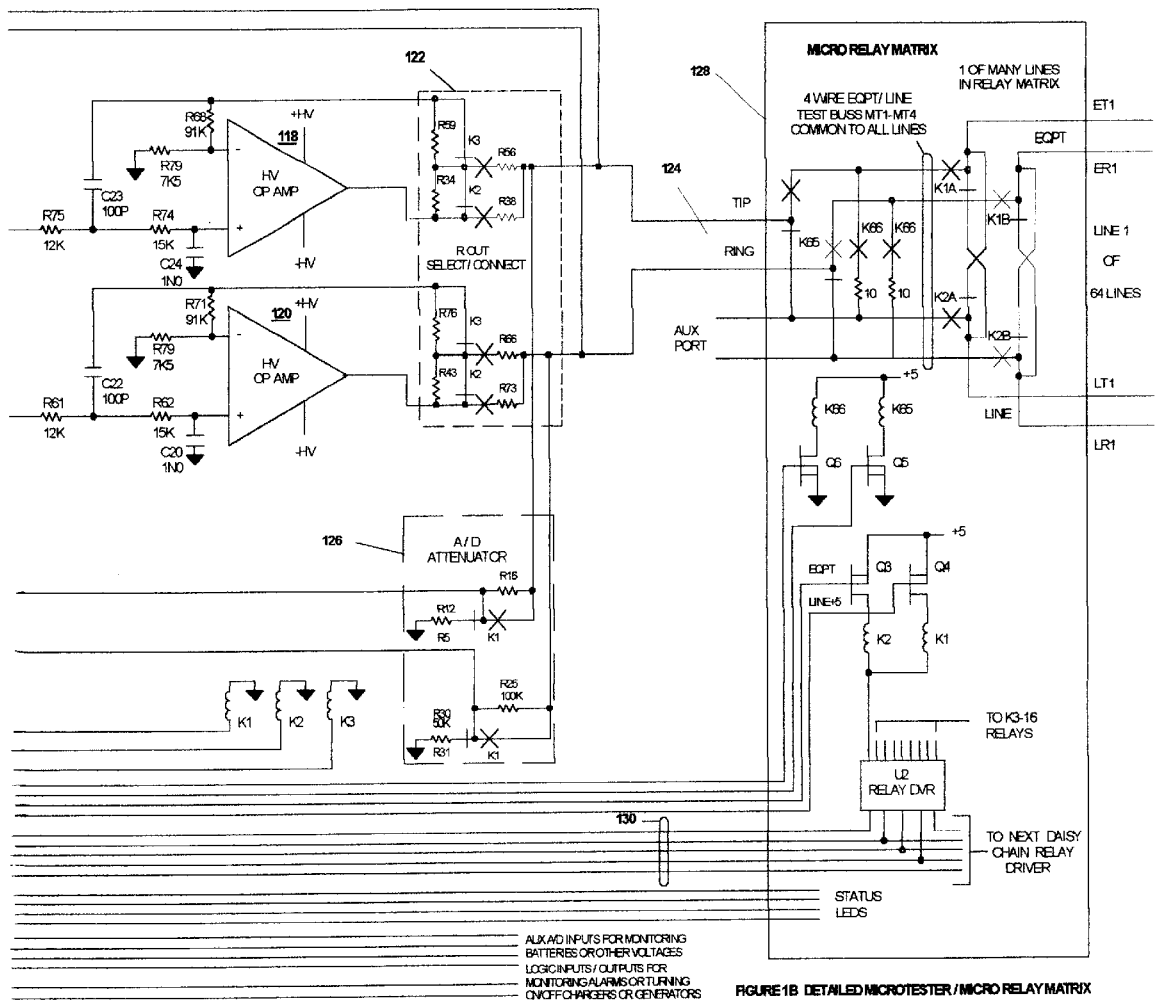
FIGURE 2B (2 OF 2)
DETAILED MICROTESTER / MICROMATRIX BLOCK DIAGRAM

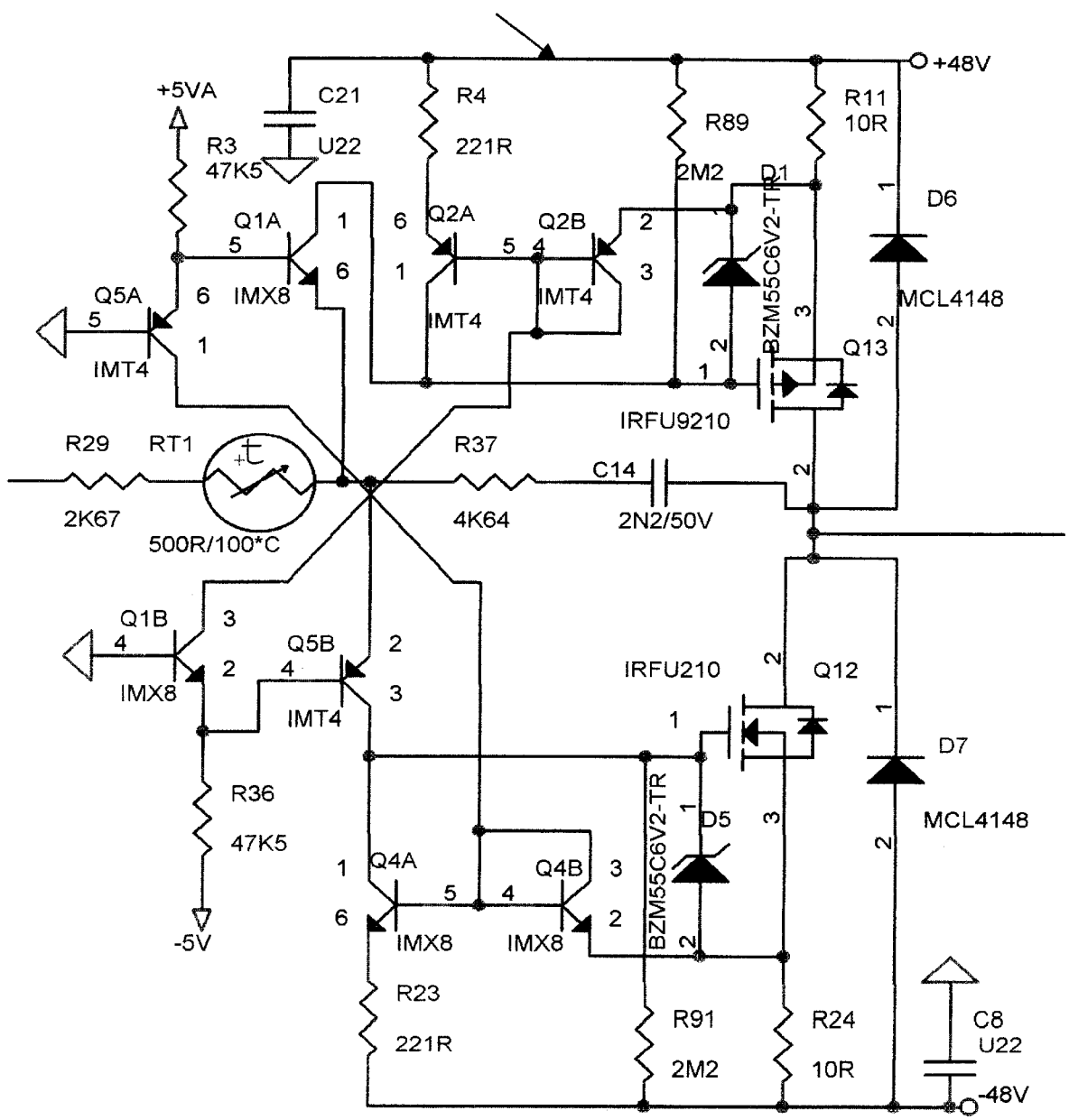
FIGURE 3 MICROTESTOR HIGH VOLTAGE OP AMP DRIVER 118

FIGURE 4A ACTUAL CIRCUIT
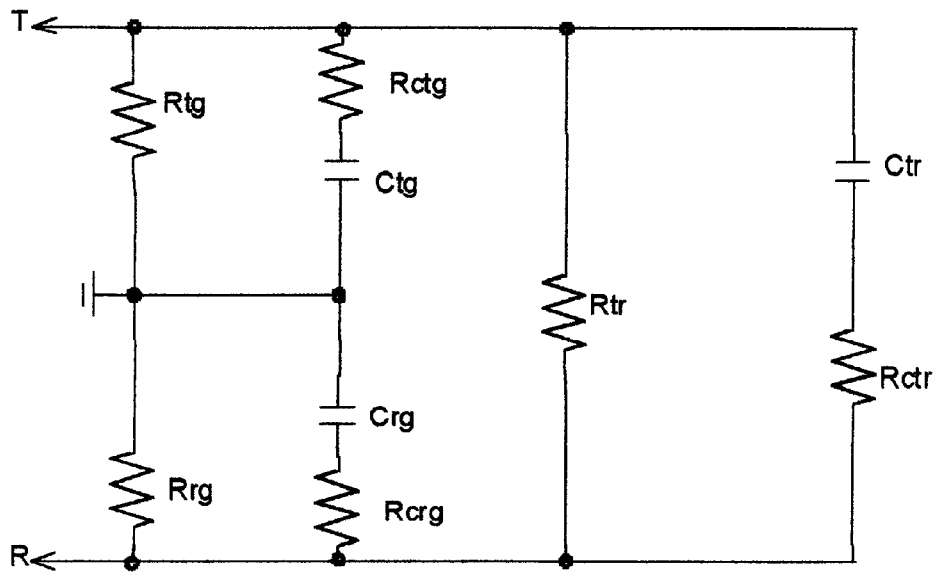
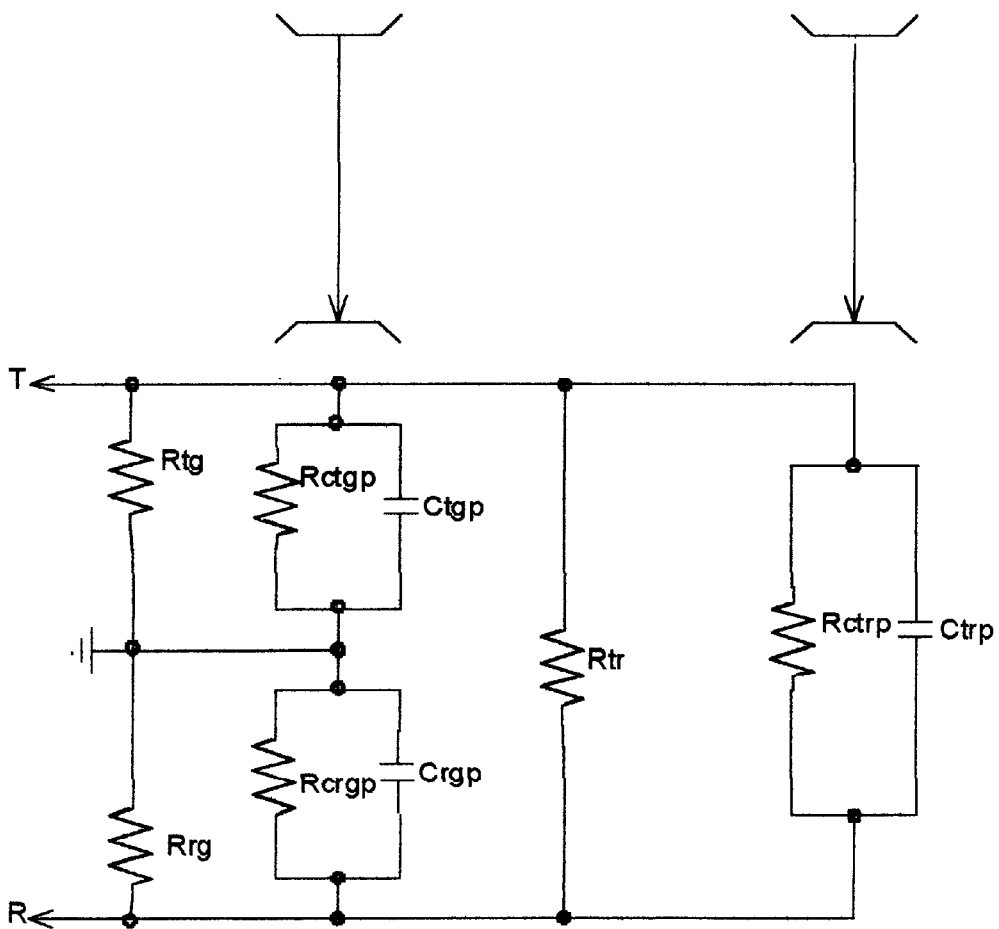
FIGURE 4B PARALLEL EQUIVALANT CIRCUIT TO BE MEASURED

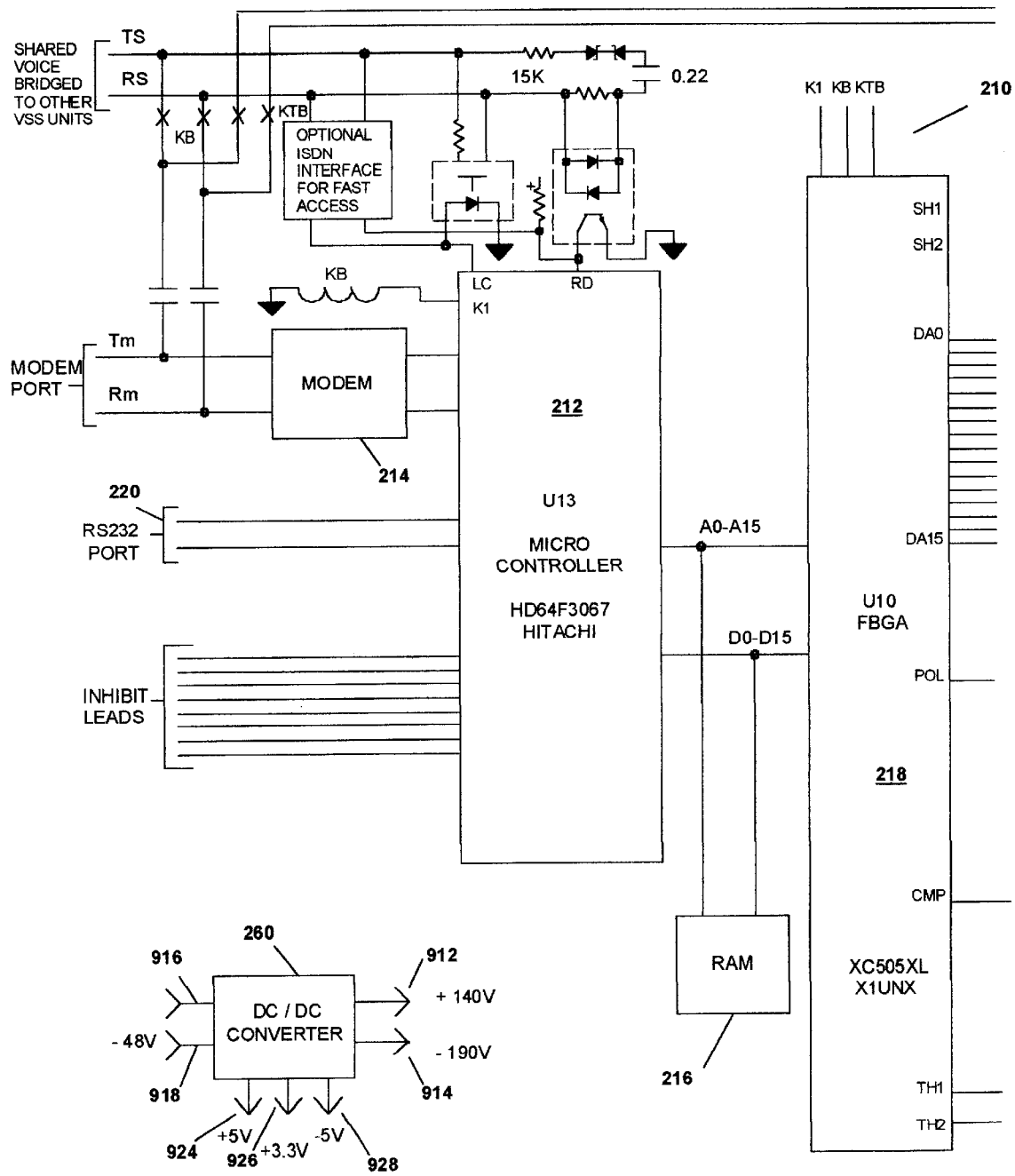
FIGURE 5A (1 OF 2) VIRTUAL SIGNATURE SYNTHYZER

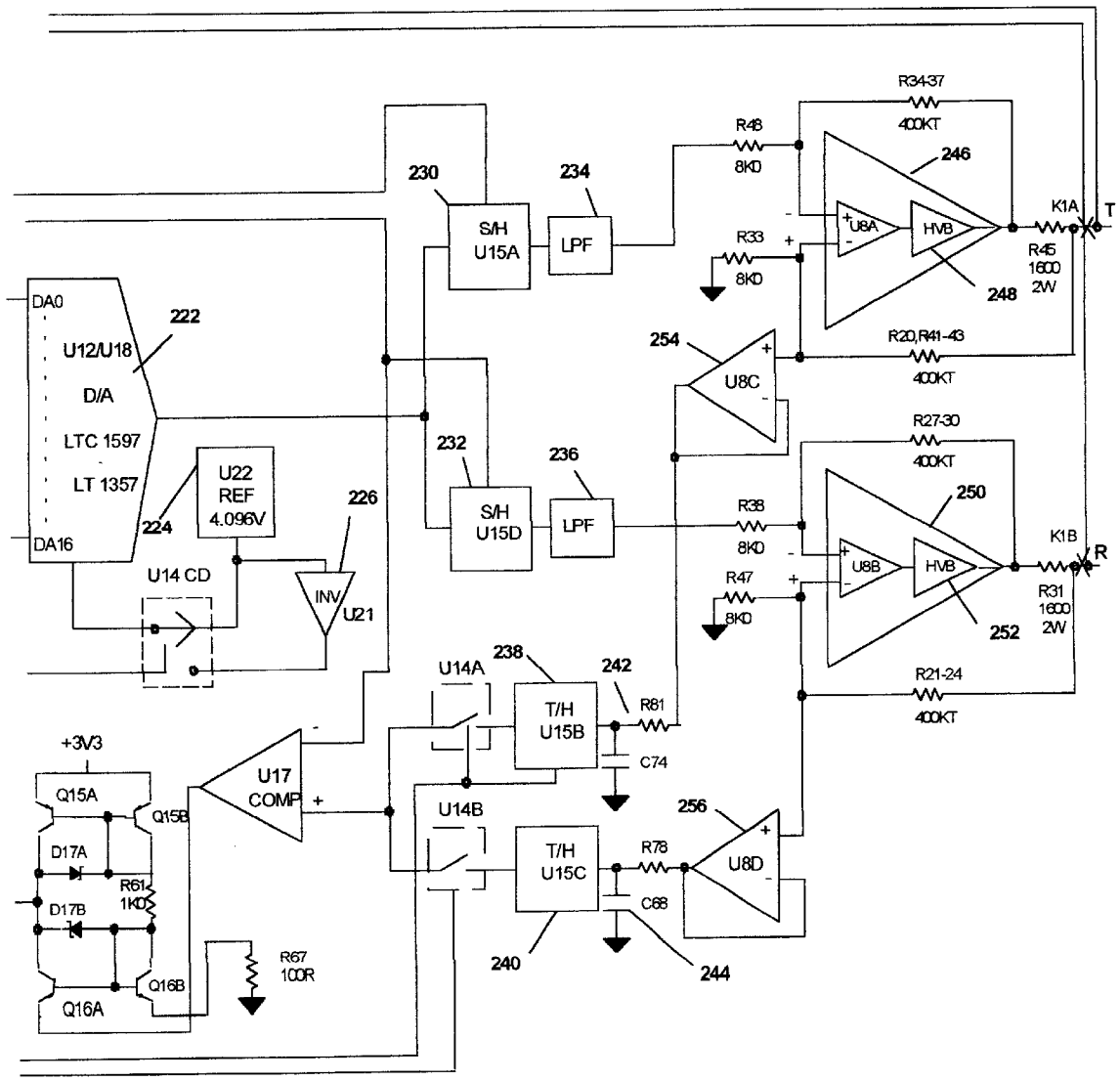
FIGURE 5A (2 OF 2) VIRTUAL SIGNATURE SYNTHYZER (VSS)

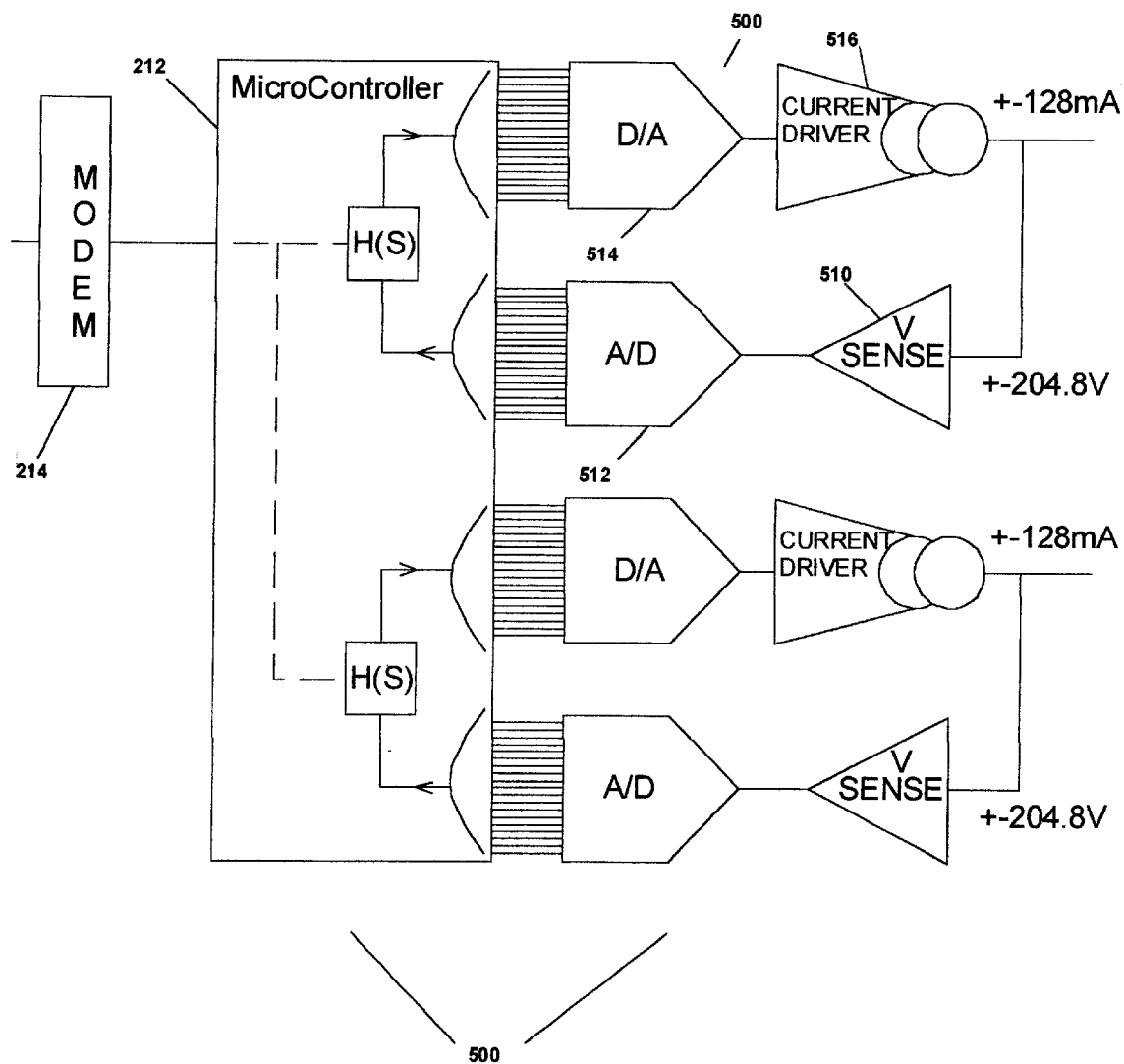
FIGURE 5B VSS EQUIVALENT CIRCUIT

FIGURE 7 VSS HIGH VOLTAGE OP AMP DRIVER

FIGURE 8 MICROMATRIX DC/DC CONVERTER

FIGURE 9 VSS DC/DC CONVERTER

TELEPHONE MICRO-TESTER AND TRANSPORT SYSTEM

BACKGROUND OF THE INVENTION

1. Field of the Invention

This invention relates generally to telephone test circuitry and more particularly, it relates to a low cost telephony micro-tester and transport system for testing smaller remote subscriber line carrier (SLC) equipment on a more effective and efficient basis. In particular, the present invention is directed to a telephony micro-tester system which includes a small integrated micro-controller, tip and ring D/A circuitry, tip and ring A/D circuitry, and tip and ring high voltage operational amplifiers for testing accurately subscriber's telephone lines and/or equipment and which is remotely programmable.

2. Description of the Prior Art

As is generally well-known in the field of telephone communication systems, in the past many years telephone companies have installed large multi-conductor metallic cables either buried underground or suspended above ground between poles or towers. More recently, the telephone companies have replacing the metallic cables with fiber optics cables which are suitable for a digital carrier system. Further, over the last 20 years the telephone companies have installing remote subscriber line carrier (SLC) equipment in pedestals or towers located at spaced apart positions along the underground or aerial cables as well as in residential and commercial facilities.

However, faults sometimes develop in the cables and/or equipment which requires repair or replacement of the same. Thus, the telephone companies have been presently testing the customer's or subscriber's telephone lines from the central office (CO) in order to determine the location of the faults so as to know where to dispatch the lineman or repairman. Such tests typically include performing low frequency and DC tests on the customer's line so as to determine hazardous or foreign potentials, presence of a telephone or ringing, a receiver off-hook (ROH), a short circuit between two or more lines, an open circuit, line length, balance in the line, and sometimes presence of noise.

In order to facilitate the testing for faults in these SLC equipment, the telephone companies have traditionally using an additional copper cable pair to perform the testing. As copper cables were being replaced with the fiber cables, remote testers were used to perform the testing. However, these remote testers suffered the disadvantage of being very slow and expensive in cost. More recently (in the last eight years), the telephone companies have been using a test transparent product consisting of a derived or simulated test pair referred to as a "metallic channel unit" (MCU) which is manufactured and sold by Tollgrade Communications, Inc. of Wilmington, Del. The MCU is used to create a virtual cable pair which can extend the transmission path from the CO of the telephone company to the remote SLC equipment so as to test the customer's lines. Such a test transparent product is described and illustrated in U.S. Pat. No. 5,457,743 issued on Oct. 10, 1995 and entitled "Metallic Channel Unit Network", which is assigned to Tollgrade Communications. This '743 patent is hereby incorporated by reference in its entirety.

There are also known of other tester in the prior art which have developed such as disclosed in International Patent Application No. PCT/US98//07613 filed on Apr. 17, 1998 and entitled "Telephony Test System With Adjustable Output Impedance". This PCT application was assigned Publication No. WO 98/47272 and published on Oct. 22, 1998. The PCT application is assigned to Tollgrade Communications, which is also hereby incorporated by reference.

Specifically, the International Patent Application No. PCT/US98/07613 discloses a telephony test system which includes a controller, a programmable gate array (PGA), and a digital signal processor connected by a common bus. The PGA has its output connected to an input of D/A converter and its input connected to the output of an A/D converter. A driver circuit is connected between the D/A converter and a telephone circuit and between the A/D converter and the telephone circuit. Under the control of the digital signal processor, the driver circuit generates voltages to the telephone circuit and samples the response thereof to such generated voltages. The driver circuit includes control inputs for receiving from the PGA an impedance adjust signal and a resistance adjust signal. An output impedance of the driver circuit connected to the telephone circuit is adjustable as a function of the impedance adjust signal and the resistance adjust signal.

Unfortunately, as the fiber optics cables are installed closer to the subscribers the SLC equipment are now producing smaller SLC systems with line counts of 48, 24, 12, 8 and 6 lines. As a consequence, this has created a testing problem due to the fact that the MCU transparent product and other prior art test systems are too expensive to be used economically for these smaller SLC systems.

Accordingly it would be desirable to provide a low cost telephony micro-tester and transport system for testing these smaller remote SLC systems which is quite accurate and is programmable remotely. The present invention represents a significant improvement over the aforementioned '743 patent and International Patent Application No. PCT/US98/07613.

SUMMARY OF THE INVENTION

Accordingly, it is a general object of the present invention to provide a telephone micro-tester and transport system and method for testing smaller remote SLC customer's lines and terminal equipment which overcomes the disadvantages of the prior art telephone testing techniques.

It is an object of the present invention to provide a telephone micro-tester and transport system and method for testing smaller remote SLC customer's lines and terminal equipment on a more economical and efficient basis.

It is another object of the present invention to provide telephone micro-tester and transport system compatible with existing central office testers for testing smaller SLC customers lines and equipment which includes a micro-tester located at a remote terminal for measuring and storing signatures of test performed and a synthesizer located at the telephone company's central office for re-creating virtual signatures corresponding to the signatures of the test performed by the micro-tester at the remote terminal.

It is still another object of the present invention to provide a telephone micro-tester system for testing smaller SLC customer's lines and terminal equipment which includes a micro-controller, D/A circuitry, high voltage amplifier driver, A/D attenuator, and A/D circuitry all interconnected for simulating the line through the D/A circuitry and the high voltage amplifier driver and for generating the signatures through the A/D attenuator and the A D circuitry.

In a preferred embodiment of the present invention, there is provided a telephone micro-tester and transport system and method for testing smaller remote SLC customer's line and terminal equipment which includes a micro-tester located at a remote terminal and a synthesizer located at the telephone company's central office. The micro-tester is used to measure and store signatures of test performed on the SLC customer's lines and terminal equipment to determine existing faults. An interconnection path for connecting the micro-tester to the synthesizer is either embedded in the communication channel of a carrier system or provided by modems using one of the carrier channels. A first modem is located at the remote terminal is coupled to the micro-tester for transferring the measured and stored signatures of the test performed to a second modem.

The second modem is located at the telephone company's central office and receives the measured and stored signatures of the test performed which are being transferred by the first modem. The synthesizer is coupled to the embedded communication channel or the second modem for re-creating virtual signatures corresponding to the signatures of the test performed by the micro-tester and for transporting them to a test system at the telephone company's central office.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 1 is a simplified block diagram of a micro-tester for use in a telephony micro-tester and transport system, constructed in accordance with the principles of the present invention;

FIGS. 2a and 2b, when connected together, is a detailed schematic circuit diagram of the micro-tester of FIG. 1;

FIG. 3 is a detailed schematic circuit diagram of the high voltage operational amplifier buffer of FIG. 1;

FIG. 4(a) is a schematic diagram of the equivalent circuit of the linear actual signature;

FIG. 4(b) is a schematic diagram of the parallel equivalent circuit of FIG. 4(a);

FIG. 5(a) is detailed block diagram of a virtual signature synthesizer for use in a telephone micro-tester and transport system of the present invention;

FIG. 5(b) is a simplified equivalent circuit for the virtual signature synthesizer of FIG. 5(a);

DESCRIPTION OF THE PREFERRED EMBODIMENT

A new and novel low cost telephony micro-tester and transport system for testing smaller remote subscriber line carrier systems is described. In the following description, numerous specific details are set forth, such as specific circuit configurations, components and the like in order to provide a thorough understanding of the present invention. However, it should be apparent to those skilled in the art that the present invention may be practiced without the specific details. In other instances, well-known processes, circuits and control lines, not particularly relevant to the understanding of the operating principles of the present invention, have been purposely omitted for the sake of clarity.

Figure 10:
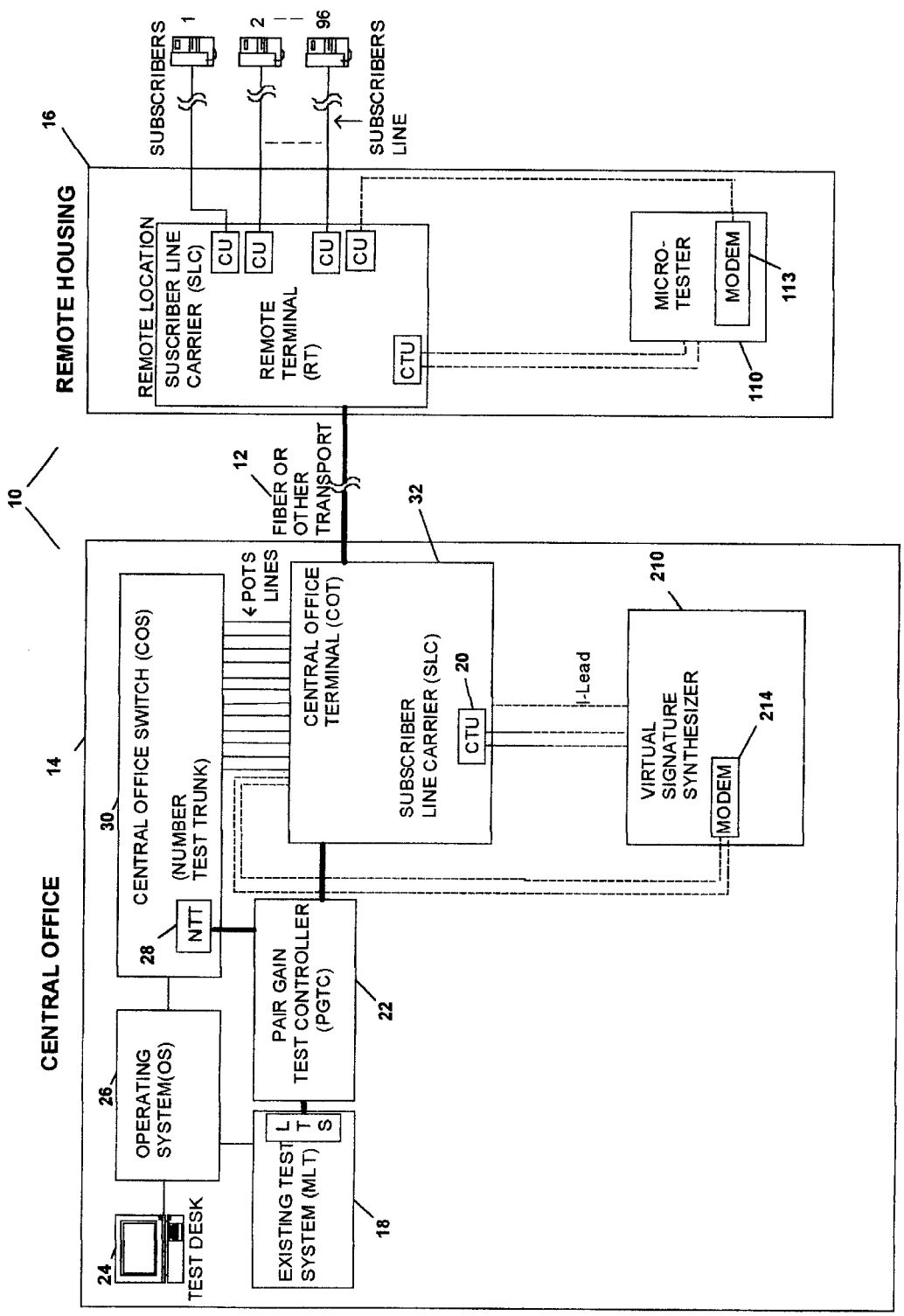
FIG. 10 is a simplified general block diagram of a subscriber line carrier (SLC) communication network which incorporates a telephone micro-tester and transport system constructed in accordance with the principles of the present invention.

Referring now in details to the drawings, there is illustrated in FIG. 10 a simplified general block diagram of a subscriber line carrier (SLC) communication network 10 which incorporates a telephony micro-tester and transport system constructed in accordance with the principles of the present invention. The SLC communication network 10 includes fiber optics 12 or other transport medium suitable for a digital carrier system which is interconnected between a central office (CO) 14 and a remote housing location 16. The telephony micro-tester and transport system of the present invention is comprised of a micro-tester 110 located in the remote housing location 16 near a remote terminal (RT) and a virtual signature synthesizer (VSS) 210 located in the central office near a central office terminal (COT). Signatures as measured by the remotely-located micro-tester 110 are actually transported to the VSS 210 in the central office 14 which are then quickly presented to a central office tester (MLT) 18 via a cut-through-unit (CTU) port 20 and a pair gain test controller (PGTC) 22.

Testing is usually initiated by a maintenance administrator at a test desk 24 through an operating system (OS) 26. The OS 26 dials the appropriate access number through number test trunk (NTT) 28 in the central office switch (COS) 30, and the central office operates an appropriate relay so as to connect the MLT 18 through the PGTC 22 and the NTT 28 to the subscriber's CO access lines (POTS) coupled to the COT 32. The micro-tester 110 communicates with the VSS 210 through built-in fast train modems 113,214 over a single voice channel of the SLC communication network 10.

Alternately, the micro-tester 110 and the VSS 210 can be built directly into the respective remote terminal and central office terminal of the SLC network so as to eliminate the use of the modems 113,214. In such instance, the communication channel is embedded in the overhead bits in the SLC network. Further, one VSS 210 located at the CO can be shared by a plurality of remotely-located micro-testers. This is accomplished by monitoring a ground (Busy) on each inhibit lead (I-inhibit) from each of the micro-testers and by then fast dialing the particular micro-tester to be tested at the remote location. This can be accomplished alternately by the micro-tester monitoring the test buss for the signature on the test buss in the remote terminal for a connection.

To the end, there is shown in FIG. 1 a simplified block diagram of a low cost telephony micro-tester system 110, constructed in accordance with the principles of the present invention. The micro-tester system 110 includes a micro-controller 112 with built-in digital-to-analog (D/A) and analog-to-digital (A/D) circuitry, a tip high voltage (HV) operational amplifier (OP AMP) 118, and a ring high voltage (HV) operational amplifier (OP AMP) 120. An output impedance network 122 is interconnected between the outputs of OP AMPs 118 and 120 and a bidirectional port 124 formed by a tip terminal and a ring terminal. An A/D attenuator 126 is interconnected between the bidirectional port 124 and the tip/ring A/D interface circuitry 116 so as to provide a selectable 4-to-1 or other suitable attenuation ratio for higher accuracy during testing. A micro-relay matrix 128 is optionally coupled to the tip and ring terminals at the bidirectional port 124 so as to facilitate the interconnection of the of the micro-tester system 110 to either a relay mounted in the line circuits of the SLC systems or an external relay matrix used in retrofitted systems.

The micro-controller 112 is of the type similar to HD64F3067-F2D which is manufactured and sold by Hitachi. The micro-controller 112 (U5) includes a built-in A/D converter, a D/A converter, a read/address memory (RAM) and a Flash memory. The micro-controller U5 first receives instructions via an input port which may have fast train modem 113 (pins TXD1 and RXD1) or RS232 port (pins TXD0 and RXD0) to test a certain line or equipment port of the relay matrix 128. It then optionally operates the correct relays, measures for hazardous potential and if none is found, the micro-controller U5 will stimulate the line using its own D/A converters through the HV OP AMPS 118,120 and measure with the A/D interface circuitry 116 through the A/D attenuator 126 which is switched out for most of the tests. A predetermined number of tests will be performed, plus branch testing based on an initial testing, and a final line signature is determined. Optionally, fault-analysis algorithms are utilized to determine the specific types of faults found.

Two RS232 ports are provided as shown in FIG. 2a, one port 115 for communication direct or through the fast train modem 113 from a test element manager or virtual signature synthesizer (VSS) located at the CO and the other port 117 being used to control an external relay matrix or other remote equipment. An integrated circuit chip U8 is an External Serial 2 KB Flash memory which is optionally used for storing status or previous test results in case of a power failure. Alternatively, it may be desirable to store the previous signatures of tests for all the lines connected to its matrix, or it might be useful to store other information specific to each customer. An integrated circuit chip U9 is an identification (ID) memory which is useful when the micro-tester system 110 is required to identify itself, for example, if it auto dials a predefined number to report an alarm or low battery status.

An integrated circuit chip U7 is a power-on reset circuit which resets the micro-controller U5 at power on so as to ensure a clean boot-up, or if a power glitch occurs, then the chip U7 will reset the micro-controller to ensure a fresh uncorrupted start. An integrated circuit U10 is a stable reference power supply which provides a precision (+4.096) voltage reference for the A/D and D/A interface circuitry 116,114. It is advantageous to have both the A/D and D/A circuitry operated on the same reference because the relative tracking will improve the testing accuracy.

The tip and ring A/D interface circuitry 116 is formed of an A/D tip interface circuit 116a and an A/D ring interface circuit 116b. The A/D tip interface circuit 116a is formed of operational amplifiers U2D, U2A, and U6A; resistors R8, R9, and R10; capacitor C5; and diodes D3A, D3B. The A/D ring interface circuit 116b is formed of operational amplifiers U2C, U2B, and U6B; resistors R2, R7, and R18; capacitor C6; and diodes D2A, D2B. The tip and ring A/D interface circuitry 116 is used to monitor the voltages measured on the tip and ring terminals and conditions the voltages so as to match the 10 bit 0 to +4.096V A/D input range. Since the A/D tip interface circuit 116a and the A/D ring interface circuit 116b are identical, it will be sufficient to discuss only the operation of the A/D ring interface circuit 116b.

In order to improve input accuracy and provide a negative input range, the operational amplifiers U2C and U2B form a precision rectifier or folder circuit which has a gain of −1 for negative input voltages and a gain of +1 for positive input voltages. The operational amplifier U6 senses the input polarity, which then becomes the 11$^{th}$ bit producing a +10 bit A/D signal or an effective 11 bit A/D signal. When the input voltage VIN is positive on the non-inverting input of the op amp U2C, U2C's output will go positive until the diode D2B start to conduct. Then, the output of op amp U2B will also go positive and is fed back through the resistor R18 to the inverting input of the op amp U2C. Since no DC current flows through the resistor R18 and likewise the resistor R7, the inverting input of the op amp U2C will become equal to the output of the op amp U2B. The output of the op amp U2C will be driven enough positive through the diode D2B so as to cause the output of the op amp U2B to track the input voltage VIN to the inverting input of the op amp U2C.

When the input voltage VIN goes negative on the non-inverting input of the op amp U2C, U2C's output will go negative so as to turn on the diode D2A instead of the diode D2B which makes the op amp U2C behave as a buffer and pulls current through the resistor R18. The op amp U2B will now function essentially as an inverter since the values of the resistors R7, R18 are equal and due to the fact that the non-inverting input of the op amp U2B is now biased to ground potential GND through the resistor R2 because the diode D2B is reversed biased. The polarity is sensed by the comparator U6B which monitors the output of the op amp U2C which is at least 0.2V positive for positive input voltages and at least −0.2V for negative input voltages.

The A/D attenuator 126 is comprised of resistors R25 (100K), R30 (100K), R31 (100K), R19 (91K), and R22 (7.5K). The A/D attenuator is provides an A/D input range of over ±200V when switched in for hazardous potential and a range of about ±50V for testing which add a factor of 4× to A/D accuracy for testing. With the relay K1 being in the relaxed or unenergized state, the resistor R25 (100K) forms a voltage divider with the resistors R30, R31, and (R19+R22) all connected in parallel, which provides an input resistance of 100K+33K=133K and a 4× drop across the resistor R25. When the relay K1 is energized or activated, the resistor R25 is shorted out and the resistors R30/R31 are removed from the circuit. This gives an input resistance of 91K+7.5K=98.5K and a dynamic range of 4.096×(91+7.5)/7.5=±+53.79V range.

The tip and ring D/A circuitry 114 is formed of a D/A tip circuit 114a and a D/A ring circuit 114b. The D/A tip circuit 114a includes operational amplifiers U1A, U4A; switch U3AB; and associated resistors R14, R26, R33. Similarly, the D/A ring circuit 114b includes operational amplifiers U1B, U4B; switch U3CD; and associated resistors R17, R13, R1. Since the D/A tip circuit 114a and the D/A ring circuit 114b are identical, it will be sufficient to discuss only the D/A tip circuit 114a. Since the micro-controller U5 used provides only an 8-bit D/A signal output, it would be desirable to have ±10 bit like the A/D input signals so as to maintain sufficient resolution.

The operational amplifier U1A functions basically as an isolation buffer which prevents load on the high impedance output from the D/A converter in the micro-controller U5. With a basic gain of 1, the resistors R14, R26, R33 add a ½ (R26) and ¼ (R33) code step to the op amp U1A output which converts the D/A converter to 10 bits. The control pins DA0–B0, DA0–B1 are driven by two least significant bits (LSB) of a 10 bit D/A word that drives the 8 bit D/A converter. The operational amplifier U4A functions an inverting amplifier with a gain of −1 with very precise resistor ratios. The switch U3AB serves as a simple 2-input analog multiplexer (MUX) which selects either a +D/A converter output or a −D/A converter output, thereby producing the D/A polarity of either + or −. This produces an effective 11-bit D/A resolution.

Since the tip HV OP AMP 118 and the ring HV OP AMP 120 are identical in their construction, it will be only necessary to describe the components and operation of one of them. Referring now to FIG. 3, there is shown a detailed schematic diagram of the tip HV OP AMP 118 for use in FIGS. 1 and 2. This tip HV OP AMP 118 is formed of a conventional low voltage amplifier, level shifting stages and output transistors so as to form a high voltage operational amplifier. As can be seen from FIG. 2, the high voltage operational amplifier is configured for a gain of 1+R68 (91K)/R69(7.5K)=13.133 which produces an output swing of 13.133×4.096V=±53.794V. When either the relay K2 or K3 is operated to connect the amplifier driver to the line, a gain error occurs due to the loading of the A/D series input resistors R19, R22. This is corrected by using either the resistor R59 or R34 to boost the gain in order to compensate for the bridging loss.

The high voltage operational amplifier includes a low voltage operational amplifier U4D which provides the basic input section and most of the gain for the high voltage operational amplifier. The remaining portion of high voltage operational amplifier provides a current gain of −R4/R11=−221/10=−22.1. The high voltage operational amplifier 118 actually functions as an operational transconductance amplifier (OTA) with a high gain, which performs the normal operational amplifier task in which the effective gain/response is determined only by the input/feedback network elements.

The high voltage operational amplifier further includes transistors Q2A, Q2B and Q13 which forms a positive current mirror arrangement with a gain of −22.1. The transistors Q2A and Q2B are essentially a differential amplifier with the emitters as inputs and the collectors as outputs so as to compare the voltage across the resistors R4 and R11. As the input current to the transistor Q2A is increased, the voltage at the collector of the transistor Q2A and at the gate of the transistor Q13 is pulled negative which draws more output current through the resistor R11. This will, in turn, pull the emitter of the transistor Q2B negative. As a result, this renders the transistor Q2A more conductive until the current in resistor R4 matches the input current from the transistor Q1A and the mirror arrangement will become balanced and at equilibrium. This substantially equal voltage on emitters of the transistors Q2A, A2B forces the same voltage across the resistor R11 as the resistor R4. The output current is then the ratio of the resistors R4/R11 times the input current from the collector of the transistor Q1A. A diode D1 protects the gate of the transistor Q13 from overvoltage when there is no load which allows its drain to saturate. A diode D6 is provided which bypass any positive transients directly to +HV (+48V) supply and protects the transistor Q13 and the resistor R11.

A negative current mirror arrangement is formed by transistors Q4A, Q4B, and Q12. Since the construction and operation of negative current mirror arrangement is identical to the just described positive current mirror arrangement, a detailed description of the same is not repeated.

A level shifter consisting of transistors Q1A, Q1B, Q5A, and Q5B is coupled to the output of the low voltage amplifier U4D. The transistor Q5A produces a bias voltage at the base of the transistor Q1A via the bias resistor R3. In addition, a bias current from the collector of this transistor Q5A is transferred to the negative current mirror arrangement to bias the differential amplifier Q4A, Q4B. Similarly, the transistor Q1B produces the bias voltage for the transistor Q5B, and also a bias current for the differential amplifier Q2A,Q2B. Since the transistor characteristics of Q5A matches Q5B and Q1A matches Q1B, the bias current in the transistors Q5A & Q1B will be mirrored in the transistors Q1A and Q5B. This sets up a substantially equal bias for the transistors Q2A, Q2B and Q4A, Q4B.

The output of the low voltage amplifier U4A drives the emitters of the transistors Q1A, Q5B through a current limiter formed by a resistor R29 and a temperature-sensitive element RT1. The maximum drive current into the transistors Q1A, Q5A is set by the output voltage (5V max) of the amplifier U4A divided by the resistance values of R29 plus RT1 or 5/(2.67+0.5)=1.57 MA producing a maximum output current of 1.57×22.1=34.8 MA. If the output transistors Q13, Q12 overheat from an overload, the element RT1 will sense this temperature and when the temperature reaches 100° C., (RT1 will be coupled to the output transistors) the maximum drive current is reduced by the element RT1's positive temperature coefficient (PTC) which dramatically increases its resistance when this 100° C. temperature is reached. A stability compensation network formed by a capacitor C14 and a resistor R37 provide stability compensation when there is no load by limiting the AC gain in order to maintain the required phase margin.

In many micro-tester installations, one of the voice channels in the SLC system is used for a communication or a control channel. This is accomplished with a fast train (50 ms) modem from the central office CO to remote terminal RT at each end so to establish training with the central office modem equipment quickly. When a test is required to be performed, the remotely-located SLC micro-tester can be dialed and connect within 50–100 ms which can be very important for backward compatibility with existing test systems. Alternatively, a sub-audio modem channel operating in the 180 to 240 HZ band may be used when the communication channel is momentarily shut down and the voice band is used to talk directly to the customer on the tested lines.

When there is difficulty in determining the fault on the line, the testing craftsman may wish to actually call the customer in order to test the connection. FIG. 1 shows a bypass relay K4 that is used for maintenance call-back bypass to connect the communication channel directly to the customer's line. During this time, the modem's transmitter is either turned off or switched to the sub-audio range of 180–240 HZ which is a low bit rate but is sufficient fast so to control the "in or out" function of the bypass relay K4.

Referring to FIG. 1, the testing theory of operation for the present invention will now be explained. In the normal test sequence, the line to be tested is driven through a source resistance R56 or R38 to prevent overload in case the line is shorted or low impedance. The micro-tester 110 applies a DC voltage and multiple AC voltages simultaneously to drive the various impedances on the line. The line voltages are measured directly by the A/D circuitry 116. A voltage Vt (or Vr) is a complex number and contains real and imaginary components for each frequency applied, and a DC value for the DC voltage applied. This is accomplished using a discrete Fourier transform (DFT) function stored as a software program in the micro-controller U5. The line current is calculated by: It=(Vto−Vt)/Ro, where the resistance value Ro=(R56 or R38)∥(R16+R27) and Vto is the tip output voltage applied to the line. The current It also has a real DC component as well as real and imaginary components for each frequency applied.

Referring now to FIGS. 4A and 4B, there is shown in FIG. 4B a parallel equivalent circuit for FIG. 4A where all of the potential signature elements can be assumed to be shunt parallel paths for the particular frequency of interest. Even the series resistor/capacitor path has a parallel equivalent dual path (at a particular test frequency). To determine the admittance (the reciprocal of impedance) for each frequency, the following complex equation is evaluated:

$$1/Z = It/Vt = \{[Re(It) + iIm(It)]/[Re(Vt) + iIm(Vt)]\}$$

$$\mathbf{X}[Re(Vt) - iIm(Vt)]/[Re(Vt) - iIm(Vt)]\} =$$

$$\{[Re(It)][Re(Vt)] + [Im(It)][Im(Vt)]\}/\{[Re(Vt)]$$

$$+ [Im(Vt)]\} + i\{[Im(It)][Re(Re(Vt)] - [Im(Vt)][Re$$

$$(It)]\}/\{[Re(Vt)] + [Im(Vt)]\}$$

where the real part and imaginary parts of the voltages are provided by the DFT.

Then the effective parallel admittance 1/Rp equals the first term and the effective 1/XCp equals the second term, where XCp=1/wCp.

Solving for Rp and Cp, there is obtained:

$$Rp = \{[Re(Vt)] + [Im(Vt)]\}/\{[Re(It)][Re(Vt)] +$$

$$[Im(It)][Im(Vt)]\}$$

$$Cp = \{[Im(It)][Re(Vt)] - [Im(Vt)][Re(It)]\}/w\{[$$

$$Re(Vt)] + [Im(Vt)]\}$$

After the parallel path R/C values are determined from the equivalent real and imaginary impedance, then the parallel equivalent can be converted to the actual series equivalent. It can be calculated as follows:

$$Rs = Rp/[1 + (wCpRp)^2]$$

$$Cs = Cp\ [1 + 1/(wCpRp)^2]$$

With reference to FIG. 4A, there is shown a schematic diagram of a DC equivalent circuit having a tip-to-ground resistance, a ring-to-ground resistance, and a tip-to-ring resistance. Thus, a guarded method is required to make these measurements. First, tip and ring are stimulated equally so that there is approximately zero volts across tip and ring so negligible current flows through the tip to ring elements, Since all of the current flows to the grounded elements, the measurements are made only on the tip-to-ground and ring-to-ground elements.

For the tip-to-ring measurements, the test signals are applied to the ring terminal only, with zero output applied to the tip terminal, the tip current is measured with the ring voltage applied. The tip-to-ring admittance is then calculated from the following equation:

$$1/Ztr = It/Vr$$

With the tip voltage Vt being near zero, there will be little current flowing through the tip-to-ground and even this is subtracted from tip current It in order to obtain a more accurate tip-to-ring current.

When testing the equipment side, the telephone micro-tester system 110 can perform the following: (1) test for battery, (2) measure ringing, (3) provide simulated loop closure, (4) listen for dial tone, (5) send or receive tones, and (6) most importantly, the desired equipment type test. For battery testing, the A/D input simply measures the battery voltage. For measuring ringing, in the A/D mode with 4× attenuator 126 switched in, the DFT simply measures the ringing frequency and level. To produce the simulated off-hook loop closure, the micro-tester system 110 first generates a high impedance to ground by providing a loop back (A/D–D/A) gain of 1 for both tip and ring separately. This makes the tip and ring driver resistance of 470 ohms appears to disappear.

To provide the off-hook DC resistance measurement, a third digital feedback path is provided which calculates the difference in the tip and ring voltage and drive both the tip and ring drivers with opposite polarity with a gain of about –½, for example. This produces an off-hook loop resistance of 940 ohms which represents, for example, a 400 ohms phone resistance plus a 540 ohms loop resistance. The digital loop gain is varied in order to generate any desired simulated loop closure DC resistance. For listening for dial tones, using the DFT function the micro-tester system 110 easily measures the dial tone frequencies and levels or any desired frequencies such as dual tone dialing. These can be accomplished even with the off-hook simulation because this is a linear system allowing for superposition analysis. For sending of tones, a function generator stored as software can be used to generate differential and/or longitudinal multiple tones.

Referring again now to FIG. 2b, the micro-relay matrix 128 is coupled to the tip and ring terminals at the bidirectional port 126. Typically, a telephone line tester normally tests one of many telephone lines which can be selected by either a relay mounted in the line circuits of the SLC systems or an external relay matrix that can be used to retrofit existing systems without built-in access relays. The telephony micro-tester system 110 has a relay matrix buss that is used to control the external micro matrix.

In this design of the present invention, the five-wire matrix buss 130 is used to select any of the relays in the micro-relay matrix 128 via a multiple of many 8 port relay driver ICs (U2) which are easily chained to as many as are required for the SLC systems. This daisy chain arrangement also allows the micro-controller U5 to count the number of relays in the matrix for self-testing or verification reasons. All relays can be master reset with CLR. To access a particular customer's line, a "1" is toggled into serial in (SI) using serial clock (SC). Fox example, if line 8 was to be selected, SC will step 8 clock cycles and then the registrar clock (RC) will toggle the "1" to turn on the relay driver for the $8^{th}$ line. The clear (CLR) resets all driver registers to zero. In order to determine how many lines are in the matrix, a "1" is toggled "N" times until the "1" appears on the serial out (SO) end lead. The number "N" that it takes to toggle the "1" through is the number of relays in the matrix.

Some telephone company (telco) relay matrixes may have only one relay per line to test the line faults only, while other relay matrixes will have two relays per line to also test the SLC line circuit, as shown in FIG. 1. When a particular line is selected, the micro-controller U5 drives the transistor Q3 or Q4 in the matrix 128 via the pin "Line +5" or the pin "EQPT +5" which selects which direction (line or equipment) is to be tested. If the equipment side is selected, then the pin 'EQPT' is also set high to operate relay K65 via the transistor Q5 which switches the test buss to the equipment side of the 4W EQPT/LINE test buss. In the idle condition the normally-closed contacts of the two relays per line are arranged to be in parallel which adds reliability by relay contact redundancy to the many lines in the matrix for the idle pass through state.

Both "in service" tip and ring voltage and loop current also can be monitored. Voltage monitor is accomplished by operating either equipment or line relay and use relay K65 to select equipment or line. Current monitoring is accomplished by operating the relay K66 first, then the relays K1–K2 are activated second, then monitor line, then the relay K65 is operated to monitor equipment and compare. For example, I loop=[(Vt−Vr)(Eqpt)−(Vt−Vr)Line]/20.

Figure 8:
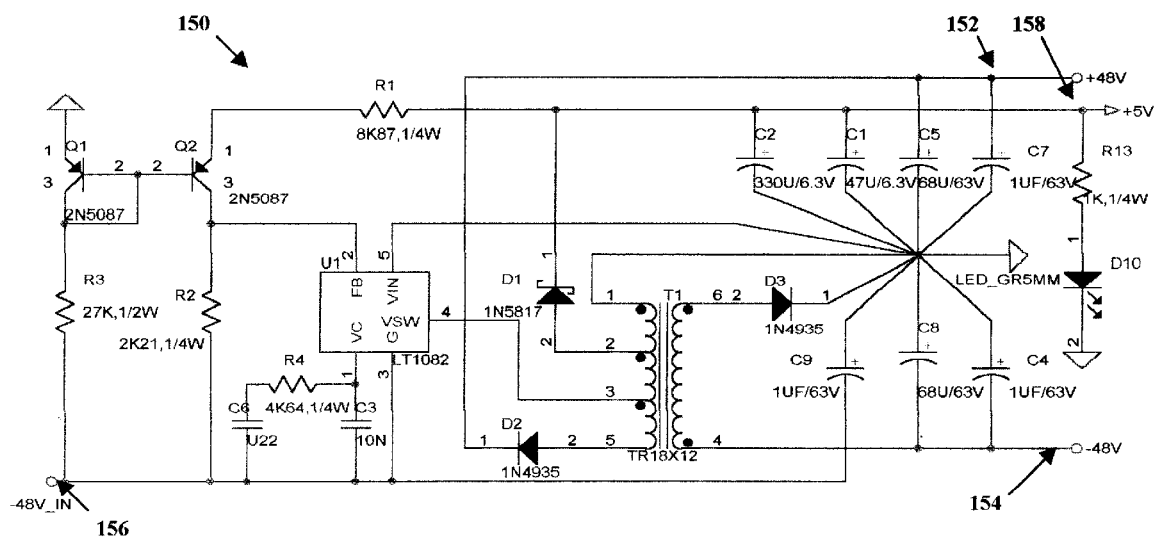
FIG. 8 is detailed schematic circuit diagram of the DC/DC converter 150 of FIG. 1.

Further, there is shown in FIG. 2a, a DC/DC converter circuit 150 which is used to create a positive high voltage +HV on line 152, a negative high voltage −HV on line 154, and a low voltage of +20 to −56V on line 156 in response to the power supply voltage of +5 volts. A detailed schematic circuit diagram of the DC/DC converter 150 of FIG. 2a is illustrated in FIG. 8. The DC/DC converter 150 function as a flyback converter and is comprised of a voltage regulator I.C. U1; transistors Q1, Q2; and resistors R1, R2. The I.C. U1 uses the resistor R1 to sense the +5v power supply on the 158. The transistor Q2 serves as a level shifter so as to regulate the voltage to −48V on the line 154 which is re-created by the resistor R2. The transistor Q1 functions to bias the emitter of the transistor Q2 to approximately 0 volts.

For backward compatibility with existing testing systems installed in the central office, a virtual signature synthesizer (VSS) 210 is provided which communicates with the remote micro-tester 110 of the present invention to obtain the measured signature values. These values are then converted by the VSS to digital feedback paths in the VSS module to re-create a virtual signature which is equal to what the micro-tester measured at the remote site. This allows the embedded central office CO testers to test the small remote sites without actually being there. The VSS is located near the CO tester and is connected to the co-tester through normal bypass pair connections.

In FIG. 5 of the drawings, there is shown a detailed block diagram of the virtual signature synthesizer (VSS) 210. The VSS 210 includes a micro-controller 212 (U13) which interfaces via a modem 214 or other embedded communication channel of a carrier system to communicate with the remote micro-testers 110 or is switchable among the many micro-testers. The micro-tester also interfaces to the shared voice test line by providing a ring detector, and loop switch, and also controls the bridge relay KB which connects the voice test line to the modem line. The micro-controller U13 is connected to the RAM 216 and to a field programmable gate array (FPGA) 218 (U10) which interfaces with the analog circuitry. The micro-controller U13 also has a RS232 port 220 that can also be used for communication with embedded communication channels on some SLC systems.

The main function of the FPGA (U10) is to generate the successive approximation register (SAR) which controls the digital-to-analog (D/A) converter 222 with the comparator (U17) to form an analog-to-digital (A/D) converter. The FPGA 218 also controls all of the transmission gates to control the D/A polarity (U14CD), A/D input MUX (U14A, U14B), and D/A sample and hold (S/H) buffers 230, 232 (U15A, U15D). The FPGA 218 further controls the timing of the A/D and D/A converters, and the micro-controller U13 interfaces this data to and from the RAM 216.

The digital-to-analog (D/A) converter 222 is formed by integrated circuits U12/U18 which is a 16-bit four quadrant D/A converter that becomes an efficient 17-bit with the addition of polarity MUX U14CD. An integrated circuit 224 (U22) is a stable source for generating a +4.096V reference, which also drives an inverter 226 (U21) to provide a −4.096V reference. The switch U14CD selects the polarity to the D/A converter U12/U18.

Since the comparator U17 is not stable enough for 16-bit SAR operation because of its low gain and instability, there will be created oscillations occurring due to coupling from its output to its input. In order to eliminate or reduce this problem, there is provided an isolation circuit 228 formed by transistors Q15A, Q15b/Q16A, Q16B and the associated elements for producing a low impedance to the comparator's output, which lowers the output swing and the dv/dt rate of the comparator. The isolation circuit 228 transfers the output current from the comparator U17 into a high impedance at a location away from the comparator and close to the FPGA 218. The high impedance of the isolation circuit 228 also adds gain to the comparator U17 for rendering a higher accuracy.

The sample and hold (S/H) buffers 230,232 (U15A, U15D) are required to hold the output voltages from the tip and ring D/A converter 222 (U15A, U15D) between samples. Tip and ring low pass filters 234,236 are connected to the respective outputs of the S/H buffers 230,232 so to provide re-construction of the waveforms to bridge a smooth transition between samples.

Track and hold (T/H) amplifier circuits 238,240 (U15B, U15C) are necessary to hold the analog sampled inputs steady during the SAR conversions in order to prevent a distortion component. Also, the timing, when the track and hold circuits are activated, must be uniformly periodic so as to not generate distortion. All of the timing is controlled by the FPGA 222 so as hold the analog samples just prior the start of the A/D conversion process. Similarly, tip and ring low pass filters 242,244 having a bandwidth of less than ½ of the sampling frequency, as required by Shannon's Sampling Therorem, are added before the T/H amplifier circuits 238,240 so as to prevent anti-aliasing in the A/D conversion process.

A tip HV OP AMP 246 is connected to the output of the low pass filter 234 and is formed of a low voltage amplifier U8A and a HV buffer 248 so as to function as an operational transconductance amplifier (OTA). Similarly, a ring HV OP AMP 250 is connected to the output of the low pass filter 236 and is formed of a low voltage amplifier U8B and a HV buffer 252. Since the HV OP AMPs 246 and 250 are identical, it will be sufficient to describe only the operation of the tip HV OP AMP 246.

The tip HV OP AMP 246 performs the function of driving a current to the tip terminal based on the output from the D/A converter 222. This is accomplished with the program resistors R34–R37, R48, R33, R20, R41–R43 and R45. Thus, the transfer function becomes Io=Vin×(Rf/Rin)×1/Ro or Vin×400K/8K×1/1600. The output resistance of the OTA 246 is equal to the sum of the resistors connected to its non-inverting input or 408K ohms. It is very important that the values of resistors connected to the respective inverting and non-inverting inputs of the OTA 246 be well matched. Otherwise, the output resistance thereof will deviate from the nominal 408K ohms.

Figure 7:
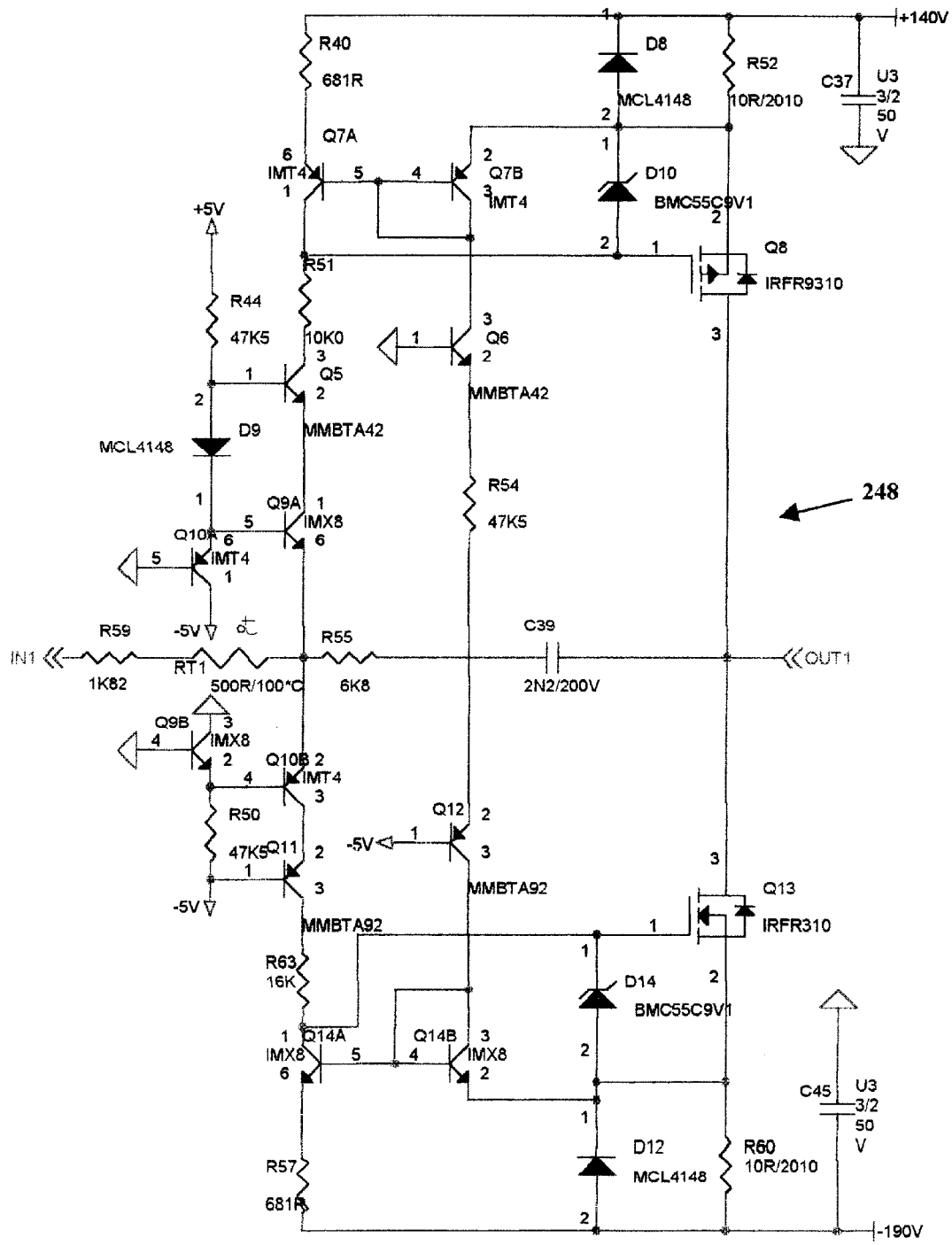
FIG. 7 is a detailed schematic circuit diagram of the HV buffer 248 of FIG. 5(a)

A detailed schematic diagram of the HV buffer 248 is depicted in FIG. 7. As will be noted, the HV buffer 248 is quite similar in its construction to the amplifier driver in the micro-tester system 110. In particular, the amplifier driver further includes transistors Q7A, Q7B and Q8 which forms a positive current mirror arrangement with a gain of −68.1. The transistors Q7A and Q7B are essentially a differential amplifier with the emitters as inputs and the collectors as outputs so as to compare the voltage across the resistors R40 and R52. As the input current to the transistor Q7A is increased, the voltage at the collector of the transistor Q7A and at the gate of the transistor Q8 is pulled negative which draws more output current through the transistor Q8 and the resistor R52. This will, in turn, pull the emitter of the transistor Q7B negative. As a result, this renders the transistor Q7A more conductive until the current in resistor R40 matches the input current from the transistor Q5 and the mirror arrangement will become balanced and at equilibrium. This substantially equal voltage on emitters of the transistors Q7A, Q7B forces the same voltage across the resistor R52 as the resistor R40. The output current is then the ratio of the resistors R40/R52 times the input current from the collector of the transistor Q5. A diode D10 protects the gate of the transistor Q8 from overvoltage when there is no load which allows its drain to saturate. A diode D8 is provided which bypass any positive transients directly to +140V HV supply and protects the transistor Q8 and the resistor R52.

A negative current mirror arrangement is formed by transistors Q14A, Q14B, and Q13. Since the construction and operation of negative current mirror arrangement is identical to the just described positive current mirror arrangement, a detailed description of the same is not repeated.

A level shifter consisting of transistors Q10A, Q9A, Q9B, Q5, Q11 and Q10A is coupled to the output of the low voltage amplifier U8A. The transistor Q10A produces a bias voltage at the base of the transistor Q9A via the bias resistor R44. Similarly, the transistor Q9B produces the bias voltage for the transistor Q10B. Since the transistor characteristics of Q10A matches Q10B and Q9A matches Q9B, the bias current in the transistors Q10A and Q9B will be mirrored in the transistors Q9A and Q10B. This sets up a substantially equal bias for the transistors Q7A and Q14A. A near equal bias is set up by the resistor R54 and the transistors Q6, Q12.

The output of the low voltage amplifier U8A (FIG. 5) drives the emitters of the transistors Q9A, Q10B through a current limiter (thermo-limiter having a positive temperature coefficient) formed by a resistor R59 and a temperature-sensitive element RT1. The maximum drive current into the transistors Q9A, Q10B is set by the output voltage (5V max) of the amplifier U8A divided by the resistance values of R59 plus RT1 or 5/(1.82K+0.5K)=2.16 mA producing a maximum output current of 2.16 mA×68.1=146 mA. If the output transistors Q8, Q13 overheat from an overload, the element RT1 will sense this temperature and when the temperature reaches about 100° C., (RT1 is thermally coupled to the output transistors) the maximum drive current is reduced by the element RT1's positive temperature coefficient (PTC) which dramatically increases its resistance when this 100° C. temperature is reached. A stability compensation network formed by a capacitor C39 and a resistor R55 provides stability compensation when there is no load by limiting the AC gain in order to maintain the required phase margin.

Since the level shifting transistors Q10, Q9 are biased near to the ground potential, the supply voltages could collapse under a load, but the HV op amp 248 would still continue to operate properly. This is desirable because it permits the use of a smaller size DC/DC converter. By providing the differential pair transistors Q7A, Q7B (Q14A, Q14B), there is allowed the use of a very small resistor value for R52 (e.g., 10 ohms) which produces a minimum resistance of about 13 ohms total to each of the supply rails. As a result, there is generated only 1.664V (128 mA×13 ohms) from the supply rails.

Tip and ring A/D sense amplifiers 254,256 (U8C, U8D) are used to receive respective incoming tip and ring signals applied to the tip and ring terminals 258, 260. The tip and ring A/D sense amplifiers 254, 254 use the same resistors as connected to the non-inverting input of the OTA drivers 246, 250 so as to not only save cost, but also more importantly to provide better accuracy.

In FIG. 5b, there is shown a simplified block diagram of an equivalent circuit 500 for the VSS 210 of FIG. 5. In operation, the voltage sense amplifier circuitry 510 including the associated A/D converter circuitry 512 can be simplified down to an A/D circuit with a ±204.8 voltage range, for example, or other desirable, which is connected to a digital equivalent of ±16 digital bits (or $204.8V/2^{16}=3.1$ mV/STEP). Similarly, the D/A converter circuitry 514 including the associated driver circuitry 516 can be simplified to a ±16 digital bits, which is converted to a ±128 MA (or $128/2^{16}=1.95$ uA/STEP) (for example, or any desirable value) output current. The digital micro-controller 212 (U13) creates a signature by creating an effective transfer function H(S) or path from the input of the A/D converter circuitry 512 to the output of the D/A converter circuitry 514.

Figure 6:
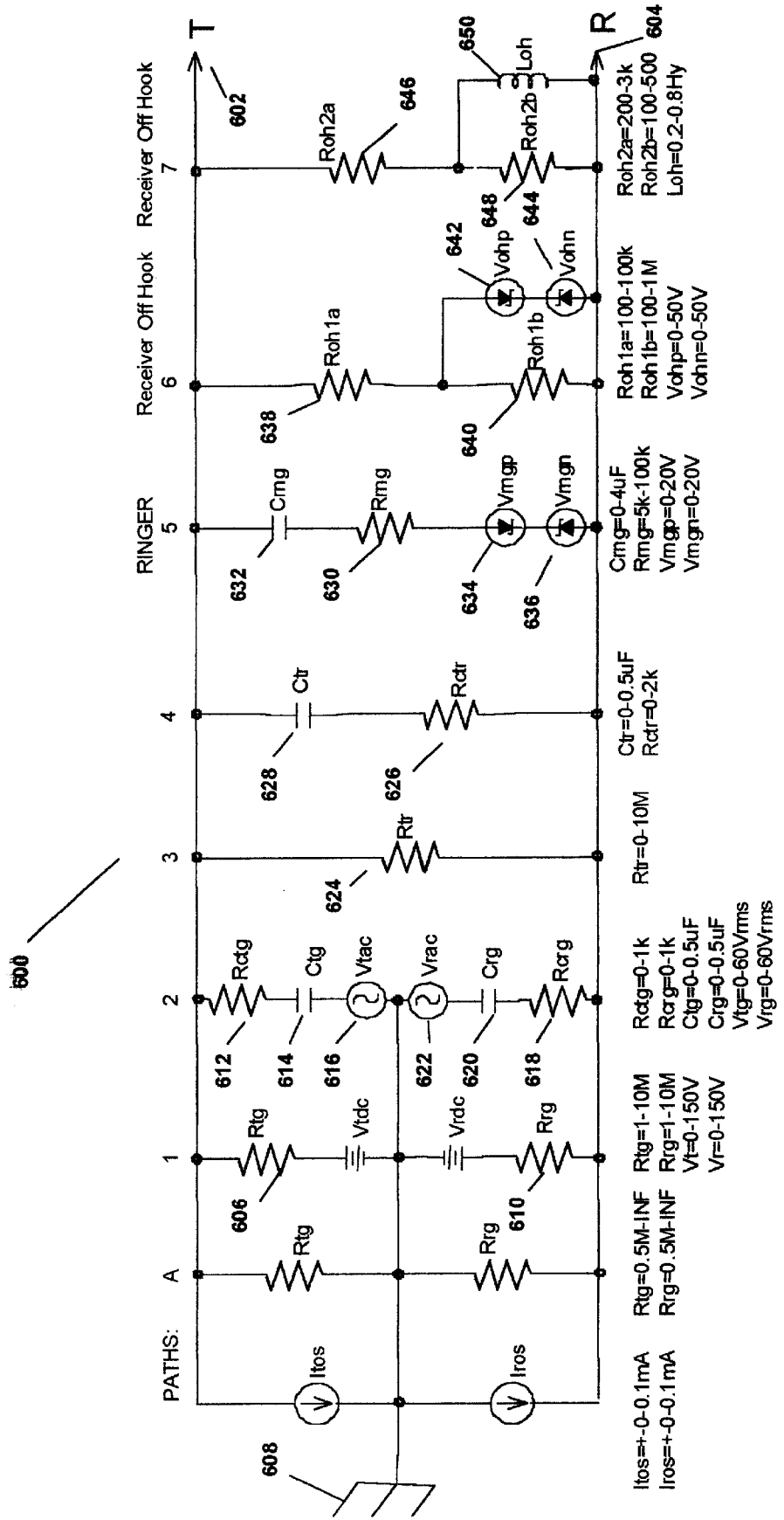
FIG. 6 is a detailed equivalent circuit for the signatures that can be re-created by the virtual signature synthesizer of FIG. 5(b)

With reference to FIG. 6, there is shown an equivalent circuit 600 for the required signatures that the VSS system 210 can re-create so as to duplicate the signatures as measured by the micro-tester system 110 for testing the tip lead 602 and the ring lead 604. It will be noted that there are seven (7) different signature paths which are to be implemented simultaneously.

In the first path (Path 1), there is a tip-to-ground resistance 606 connected between the tip lead 602 and a system ground 608 and a ring-to-ground resistance 610 connected between the ring lead 604 and the system ground 608. Further, a DC tip voltage Vtdc is connected between one end of the resistance 606 and the ground 608, and a DC ring voltage Vrdc is connected between one end of the resistance 610 and the ground 608.

With reference back to FIG. 5, the tip-to-ground output current at the tip terminal 502 is based upon the tip-to-ground voltage applied to the input of the A/D 512 and is given by equation (1) and a similar ring-to-ground output current is given by equation (2) as follows:

$$Iot=Ktg*(Vt-Vtdc); \quad (1)$$

$$Ior=Krg*(Vr-Vrdc); \quad (2)$$

Where:
Vt, Vr=tip or ring-to-ground A/D Voltage;
1/Gi=1600;
Ktg=[(1/Gi)/Rtg]=(1600/Rtg)
Krg=[(1/Gi)/Rrg]=(1600/Rrg).
*=multiply In the second path (Path 2), there is a series connection of a tip-to-ground resistance 612, a tip-to-ground capacitance 614, and an AC tip voltage 616 which are interconnected between the tip lead 602 and the ground 608. Similarly, there is a series connection of a ring-to-ground resistance 618, a ring-to-ground capacitance 620, and an AC ring voltage 622 which are interconnected between the ring lead 604 and the ground 608. Again, tip-to-ground AC output current can be determined by equation (3) and the ring-to-ground AC output current can be determined by equation (4) as follows:

$$Iot=Krct*[Vt(n)-Vt(n-1)-Vtac]+Arct*Iot(n-1) \quad (3)$$

$$Ior=Krcr*[Vr(n)-Vr(n-1)-Vrac]+Arcr*Ior(n-1) \quad (4)$$

Where:
Vt(n)=Present Vt
Vt(n−1)=Previous Vt

T=sample rate $Krct=[1600*(1+Arct)]/2*Rctg;$ $Krcr=[1600*(1+Arcr)]/2*Rcrg;$ $Arct=\{1-\tan[T/(2*Rctg*Ctg)]\}/\{1+\tan[T/(2*Rctg*Ctg)]\};$ $Arcr=\{1-\tan[T/(2*Rcrg*Crg)]\}/\{1+\tan[T/(2*Rcrg*Crg)]\}.$ In a third path (Path 3), there is a tip-to-ring resistance 624 interconnected between the tip lead 602 and the ring lead 604. The tip-to-ring output current is given by equation (5) as follows:

$$Iotr=Ktr*Vtr; \quad (5)$$

Where:

Vtr=Vt−Vr;

Vtr=tip-to-ring A/D Voltage;

Ktr=[1600/Rtr].

In a fourth path (Path 4), there is a series connection of tip-to-ring resistance 626 and a tip-to-ring capacitance 628 which are interconnected between the tip lead 602 and the ring lead 604. The tip-to-ring AC output current is given by equation (6) as follows:

$$Iotr=Krctr*\{[Vtr(n)-Vtr(n-1)]+Arctr*Iotr(n-1)\} \quad (6)$$

Where:

$Krctr=[(1600/2*Rctr)*(1+Arctr)];$ $Arctr=\{1-\tan[T/(2*Rctr*Ctr)]\}/\{1+\tan[T/(2*Rctr*Ctr)]\}.$ In a fifth path (Path 5), there is a series connection of a ringer resistance 630, a ringer capacitance 632, a first ringer Zener diode 634 and a second ringer Zener diode 636 which are interconnected between the tip lead 602 and the ring lead 604. The tip-to-ring ringer output current is expressed in equation (7) as follows:

$$Iotr=Krng*[Vrc(n)-Vc(n)]; \quad (7)$$

Where:

Vc(n) Krcrng*[Vrc(n)+Vrc(n−1)]+Arcrng*Vc(n−1);

Vrc(n)=Vtr(n)−Vrngp: IF Vtr(n)>=Vc(n−1)+Vrngp;

Vrc(n)=Vc(n): IF Vc(n−1)+Vrngp>Vtr(n)>Vc(n−1)−Vrngn;

Vrc(n)=Vtr(n)+Vrngn: IF Vtr(n)<=Vc(n−1)−Vrngn;

$Arcrng=\{1-\tan[T/(2*Rrng*Crng)]\}/\{1+\tan[T/(2*Rrng*Crng)]\};$

Krng=(1600/Rrng);

Krcrng=[(1−Arcrng)/2].

In the sixth path (Path 6), there is a series connection of a first off-hook resistance 638 and a second off-hook resistance 640 which are intereconnected between the tip lead 602 and the ring lead 604. Further, a series connection of a first off-hook Zener diode 642 and a second off-hook Zener diode 644 is connected in parallel with the second resistance 640 to generate a non-linear effective resistance. The tip-to-ring output current is given in equations (8) and (9) when the tip-to-ring voltage is positive and is given in equations (10) and (11) when the tip-to-ring voltage is negative as follows:

$$Iotr=Kroh2*Vtr \; IF \; [Vtr]<=[Vrp2]; \quad (8)$$

$$Iotr=Kroh1*Vtr+Vrn1 \; IF \; [Vtr]>[Vrp2]; \quad (9)$$

$$Iotr=Kroh2*Vtr \; IF \; [Vtr]<=[Vrn2]; \quad (10)$$

$$Iotr=Kroh1*Vtr+Vrp1 \; IF \; [Vtr]>[Vrn2]; \quad (11)$$

Where:

Kroh2=[1600/(Roh1a+Roh1b)];

Kroh1=(1600/Roh1a);

Vrp1=(1600/Roh1b)*Vohp;

Vrn1=(1600/Roh1b)*Vohn;

Vrp2=Vohp*[(Roh1a+Roh1b)/Roh1b];

Vrn2=Vohn*[(Roh1a+Roh1b)/Roh1b].

Finally, in the seventh path (Path 7), there is a series connection of a third off-hook resistance 646 and a fourth off-hook resistance 648 which are interconnected between the tip lead 602 and the ring lead 604. Further, an off-hook inductance 650 is connected in parallel with the fourth resistance 648. The tip-to-ring output current is provided in equation (12) as follows:

$$Iotr=Krloh*[Vtr(n)-Arloh*Vtr(n-1)]+Brloh*Iotr(n-1); \quad (12)$$

Where:

Krloh=(1600/Roh2a)*[(1−Brloh)/(1−Arloh)];

$Arloh=\{1-\tan[(Roh2b*T)/(2*Loh)]\}/\{1+\tan[(Roh2b*T)/(2*Loh)]\};$ $Brloh=\{1-\tan[(Roh2a*Roh2b*T)/(2*Loh*(Roh2a+Roh2b))]\}/\{1+\tan[(Roh2a*Roh2b*T)/(2*Loh*(Roh2a+Roh2b))]\}.$ A program stored in the micro-tester system 110 is used to define which one or more of the above seven signature paths are to be synthesized by the VSS system 210. In operation, all data will be sent by the micro-tester system through the RS-232 or modem path to the VSS system. Based upon the data sent by the micro-tester system, the VSS system will be able to calculate the coefficients and simulate the signatures from the above equations (1) through (12).

The inhibit leads can be used to instruct the Vss system 210 as to which remote micro-tester system 110 is to be connected for testing. The maintenance channel is used by the maintenance person to talk directly to the subscriber over the modem channel. A VSS shared voice test buss (Ts, Rs) is used to dial the maintenance person, and the VSS system 210 routes the voice channel over the modem to the micro-tester system which dialed up the customer to verify operation. During the time the voice path is routed through the modem channel, the modem is switched to a sub-audible 240 Hz channel in order to maintain control of the micro-tester system. This is desirable so as to avoid using another channel.

Figure 9:
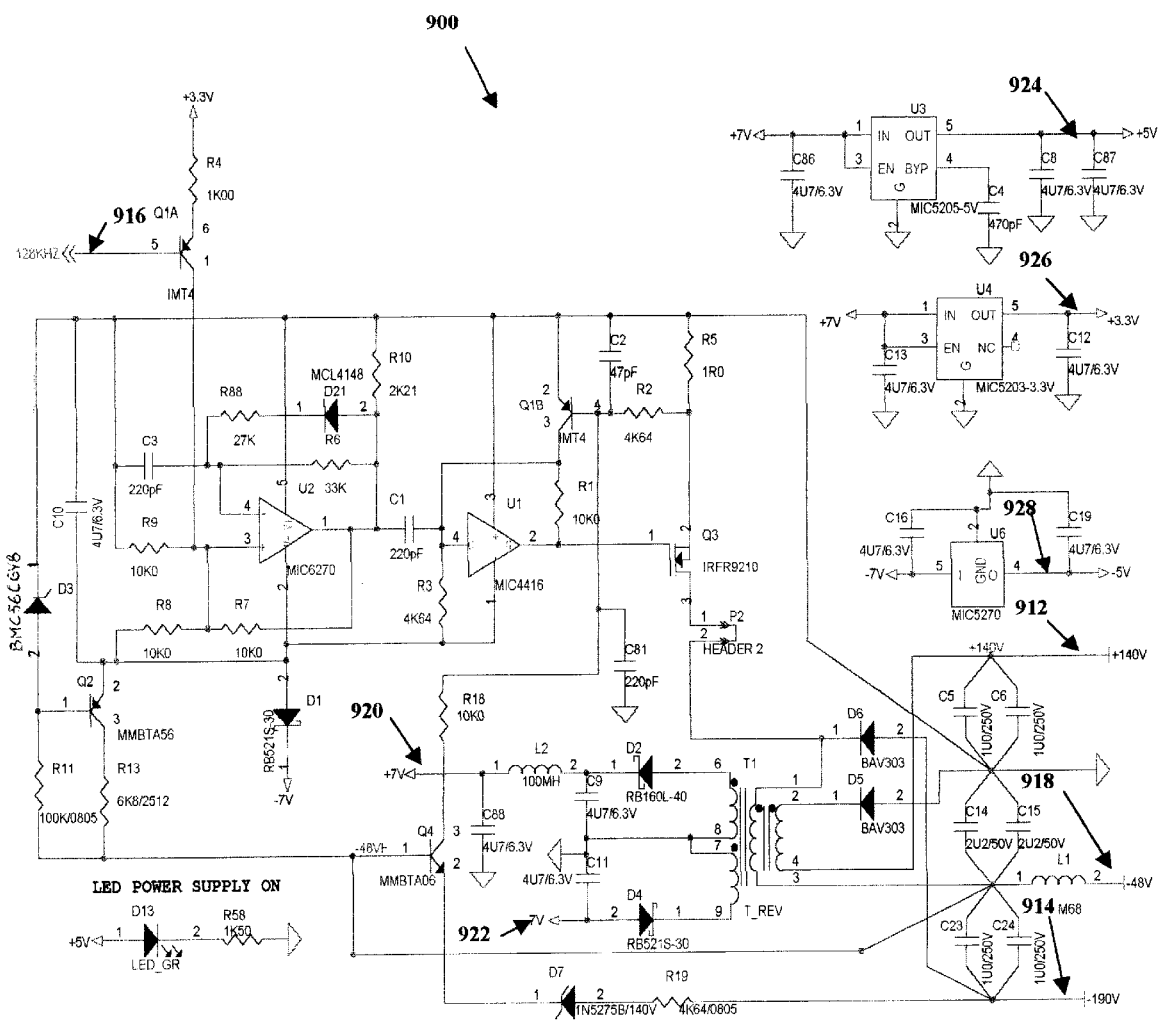
FIG. 9 is a detailed schematic circuit diagram of the VSS DC/DC converter 260 of FIG. 5(a)

In FIG. 9, there is shown a detailed schematic diagram of VSS DC/DC converter circuit 900 (corresponding to 260 in FIG. 5) for generating a positive high voltage output (+140) on line 912 and a negative high voltage output (−190) on line 914 which are coupled to the respective +HV and −HV terminals of the HV buffer 248 (FIG. 5) of the VSS system 210. The DC/DC converter circuit 900 includes an oscillator I.C. U2 which is a comparator connected together as a 128 KHz oscillator. The I.C. U2 functions as a 120 KHz oscillator having a squarewave output with a duty cycle of 75% negative as controlled by a diode D21 and a resistor R88. The oscillator U2 is synchronized up to the frequency of 128 KHz via a transistor Q1A so as to eliminate interference with other high frequency signals used by the telephone company (i.e., 8 KHz for encoder/decoder). The output of the oscillator U2 on pin 1 is capacitively coupled to an I.C. U1 which functions as latch driver. The output (pin 2) of the latch driver U1 is connected to the gate of a FET Q3. A peak current in the FET Q3 is sensed through a resistor R5. When the current exceeds a selected value, such as 0.7A, a transistor Q1B will be turned ON via a resistor R2 which will, in turn, cause the output of U1 to go high so as to turn OFF the FET Q3. Thus, the maximum current supplied to the primary windings (pins 1,3) of the transformer T1 is limited.

The votages on the load capacitors C5, C6, C14, C15, C23, C24 increase as energy is transferred to them on every cycle. This transfer of energy will be continued each cycle until the desired output voltage of −190V (−HV) on the line 914 is obtained. When the output voltage −HV exceeds −190V, the Zener diode D7 will conduct so as to cause current to flow through the resistor R19, transistor Q4, and the resistor R18. As a consequence, a voltage will be developed across the resistor R2 for lowering the bias voltage on the transistor Q1B so as to reduced the duty cycle as required by the output voltage. In this manner, there is provided a current-controlled voltage-limited −190V regulated flyback converter for generating the +140/−190V output voltages.

When the FET Q3 is turned ON during the positive cycle, the −48 input voltage on line 918 is applied across the primary winding of the transformer T1 which produces a 7.5V on the secondary windings (across pins 6,8 and pins 7,9). These secondary voltages are half-waved rectified by the respective diodes D2, D4 and capacitors C9, C11. During the negative cycle when the transistor Q3 is turned OFF, the energy stored in the transformer is transferred to the respective capacitors C5, C6 and C23, C24 for generating the +140V/−190V. The unregulated +7V and −7V on the corresponding lines 920, 922 track the −48V input voltage and are fed to voltage regulator I.C. U3, U4, and U6 so as to produce a regulated +5V, +3.3V, and −5V on respective lines 924, 926 and 928. The +140V and −190V supplies are regulated voltages while the +7V and −7V supplies track the −48V input voltage. This is important to allow the +140V and −190V supplies to collapse under heavy loads without affecting the +7V and −7V supplies.

From the foregoing detailed description, it can thus be seen that the present invention provides a telephone micro-tester and transport system and method for testing smaller remote SLC customer's lines and terminal equipment. The telephone micro-tester and transport system includes a micro-tester located at a remote terminal and a synthesizer located at the telephone company's central office. The micro-tester is used to measure and store signatures of test performed on the SLC customer's lines and terminal equipment to determine existing faults. The synthesizer functions to re-create virtual signatures corresponding to the signatures of the test performed by the micro-tester and to transport them to a test system at the telephone company's central office.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A telephone micro-tester and transport system for testing smaller remote subscriber line carrier (SEC) customer's lines and equipment, said micro-tester and transport system comprising:

micro-tester means located at a remote terminal for measuring and storing signatures of test performed on the SLC customer's lines and terminal equipment to determine existing faults;

first modem means located at the remote terminal and being coupled to said micro-tester means for transferring said measured and stored signatures of the test performed to to a second modem means;

said second modem means located at a telephone company's central office for receiving said measured and stored signatures of the test performed which are being transferred by said first modem means;

synthesizer means located at the telephone company's central office and being coupled to said second modem means for re-creating virtual signatures corresponding of test performed by said micro-tester means at the remote location and for transporting them to a test system at the telephone company's central office; and said micro-tester means including a micro-controller, D/A circuit means, high voltage amplifier driver means, A/D attenuator means, and A/D circuit means all connected together for testing the line through said D/A circuit means and said high voltage amplifier driver means and for measuring the signatures of the test performed through said A/D attenuator means and said A/D circuit means.

2. A telephone micro-tester and transport system as claimed in claim 1, wherein said D/A circuit means is coupled to said micro-controller and includes an operational amplifier buffer, an inverting operational amplifier, and a multiplexer for converting an 8-bit digital output signal from said micro-controller to a 10-bit output signal with polarity.

3. A telephone micro-tester and transport system as claimed in claim 2, wherein said A/D attenuator means is used for scaling down analog input signals for testing and said A/D circuit means serves to convert said analog signals to a 11-bit digital signal.

4. A telephone micro-tester and transport system as claimed in claim 3, wherein said high voltage amplifier driver means includes a low voltage amplifier, a level-shifting circuit, and transistor amplifiers all connected together to function as an operational transconductance amplifier.

5. A telephone micro-tester and transport system as claimed in claim 4, wherein each of said first and second modem means is comprised of a fast train modem for establishing training between the telephone company and said micro-tester means located at the remote terminal.

6. A telephone micro-tester and transport system as claimed in claim 5, wherein said fast train modem includes a sub-audio channel operating in the 180–300 Hz range for controlling testing of said micro-tester means and for allowing voice communication with the customers whose lines are being tested.

7. A telephone micro-tester and transport system as claimed in claim 1, further comprising a relay matrix interconnected between said micro-tester means and said customer's lines so to allow said micro-tester to control testing selectively of one of many telephone lines.

8. A telephone micro-tester and transport system as claimed in claim 1, said synthesizer means includes a second micro-controller, field programmable gate array means, D/A and A/d converters, sample and hold circuit means, first low pass filter means, high voltage amplifier driver means, voltage sensing circuit means, second low pass filter means, and track and hold circuit means all operatively interconnected together.

9. A telephone micro-tester and transport system as claimed in claim 8, wherein said synthesizer means further includes DC/DC converter means for generating high positive and negative regulated voltages and unregulated low power supply voltages in response to an input voltage using a single transformer.

10. A telephone micro-tester and transport system as claimed in claim 8, wherein said synthesizer means further includes a first signature path having a tip-to-ground resistance connected between a tip lead and a system ground, a ring-to-ground resistance connected between a ring lead and the system ground, a DC tip voltage connected between one end of the tip-to-ground resistance and the ground, and a DC ring voltage connected between one end of the ring-to-ground resistance and the ground so as to re-create a tip-to-ground output current and a ring-to-ground output current as follows:

$$Iot=Ktg*(Vt-Vtdc);$$

$$Ior=Krg*(Vr-Vrdc);$$

Where:
Vt, Vr=tip or ring-to-ground A/D Voltage;
1/Gi=1600;
Ktg=[(1/Gi)/Rtg]=(1600/Rtg)
Krg=[(1/Gi)/Rrg]=(1600/Rrg).

11. A telephone micro-tester and transport system as claimed in claim 10, wherein said synthesizer means further includes a second signature path having a series connection of a tip-to-ground resistance, a tip-to-ground capacitance, and an AC tip voltage which are interconnected between the tip lead and the ground, and a series connection of a ring-to-ground resistance, a ring-to-ground capacitance, and an AC ring voltage which are interconnected between the ring lead and the ground so as to re-create a tip-to-ground AC output current and a ring-to-ground AC output as follows:

$$Iot=Krct*[Vt(n)-Vt(n-1)-Vtac]+Arct*Iot(n-1)$$

$$Ior=Krcr*[Vr(n)-Vr(n-1)-Vrac]+Arcr*Ior(n-1)$$

Where:
Vt(n)=Present Vt
Vt(n-1) Previous Vt
T=sample rate
Krct=[1600*(1+Arct)]/2*Rctg;
Krcr [1600*(1+Arcr)]/2*Rcrg;
Arct={1-tan[T/(2*Rctg*Ctg)]}/{1+tan[T/(2*Rctg*Ctg)]};
Arcr={1-tan[T/(2*Rcrg*Crg)]}/{1+tan[T/(2*Rcrg*Crg)]}.

12. A telephone micro-tester and transport system as claimed in claim 11, wherein said synthesizer means further includes a third signature path having a tip-to-ring resistance interconnected between the tip lead and the ring lead so as to re-create a tip-to-ring output current as follows:

$$Iotr=Ktr*Vtr;$$

Where:
Vtr=Vt-Vr;
Vtr=tip-to-ring A/D Voltage;
Ktr=[1600/Rtr].

13. A telephone micro-tester and transport system as claimed in claim 12, wherein said synthesizer means further includes a fourth signature path having a series connection of a tip-to-ring resistance and a tip-to-ring capacitance which are interconnected between the tip lead and the ring lead so as to re-create a tip-to-ring AC output current as follows:

$$Iotr=Krctr*\{[Vtr(n)-Vtr(n-1)]+Arctr*Iotr(n-1)\} \qquad (6)$$

Where:
Krctr=[(1600/2*Rctr)*(1+Arctr)];
Arctr={1-tan[T/(2*Rctr*Ctr)]}/{1+tan[T/(2*Rctr*Ctr)]}.

14. A telephone micro-tester and transport system as claimed in claim 13, wherein said synthesizer means further includes a fifth signature path having a series connection of a ringer resistance, a ringer capacitance, a first ringer Zener diode and a second ringer Zener diode which are interconnected between the tip lead and the ring lead so as to re-create a tip-to-ring ringer output current as follows:

$$Iotr=Krng*[Vrc(n)-Vc(n)];$$

Where:
Vc(n)=Krcrng*[Vrc(n)+Vrc(n-1)]+Arcrng*Vc(n-1);
Vrc(n)=Vtr(n)-Vrngp IF Vtr(n)>=Vc(n-1)+Vrngp;
Vrc(n)=Vc(n) IF Vc(n-1)+Vrngp>Vtr(n)>Vc(n-1)-Vrngn;
Vrc(n)=Vtr(n)+Vrngn IF Vtr(n)<=Vc(n-1)-Vrngn;
Arcrng={1tan[T/(2*Rrng*Crng)]}/{1+tan[T/(2*Rrng*Crng)]};
Krng=(1600/Rrng);
Krcrng=[(1-Arcrng) 2].

15. A telephone micro-tester and transport system as claimed in claim 14, wherein said synthesizer means further includes a sixth signature path having a series connection of a first off-hook resistance, a second off-hook resistance which are intereconnected between the tip lead and the ring lead, and a series connection of a first off-hook Zener diode and a second off-hook Zener diode connected in parallel with the second off-hook resistance so as to re-create a tip-to-ring output current as follows:

when the tip-to ring voltage is positive, $$Iotr=Kroh2*Vtr \ IF \ [Vtr]<=[Vrp2];$$

$$Iotr=Kroh1*Vtr+Vrn1 \ IF \ [Vtr]>[Vrp2];$$

when the tip-to-ring voltage is negative, $$Iotr=Kroh2*Vtr \ [Vtr]<=[Vrn2];$$

$$Iotr=Kroh1*Vtr+Vrp1 \ IF \ [Vtr]>[Vrn2];$$

Where:
Kroh2=[1600/(Roh1a+Roh1b)];
Kroh1=(1600/Roh1a);
Vrp1=(1600/Roh1b)*Vohp;
Vrn1=(1600/Roh1b)*Vohn;
Vrp2=Vohp*[(Roh1a+Roh1b)/Roh1b];
Vrn2=Vohn*[(Roh1a+Roh1b)/Roh1b].

16. A telephone micro-tester and transport system as claimed in claim 15, wherein said synthesizer means further includes a seventh signature path having a series connection of a third off-hook resistance and a fourth off-hook resistance which are interconnected between the tip lead and the ring lead, and an off-hook inductance connected in parallel with the fourth off-hook resistance so as to re-create a tip-to-ring output current as follows:

$$Iotr=Krloh*[Vtr(n)-Arloh*Vtr(n-1)]+Brloh*Iotr(n-1)$$

Where:

Krloh=(1600/Roh2a)*[(1−Brloh)/(1−Arloh)];

Arloh={1−tan[(Roh2b*T)/(2*Loh)]}/{1+tan[(Roh2b*T)/(2*Loh)]}

Brloh={1−tan[(Roh2a*Roh2b*T)/(2*Loh*(Roh2a+Roh2b))]}/{1+tan[(Roh2a*Roh2b*T)/(2*Loh*(Roh2a+Roh2b))]}.

17. A telephone micro-tester and transport method for testing smaller remote subscriber line carrier (SLC) customer's lines and equipment, said micro-tester and transport method comprising the steps of:

measuring and storing signatures of test performed on the SLC customer's lines and terminal equipment to determine existing faults with a micro-tester located at a remote terminal;

transferring said measured and stored signatures of the test performed from a first modem located at the remote terminal and coupled to the micro-tester to a second modem;

receiving from the second modem located at the telephone company's central office said measured and stored signatures of the test performed which are being transferred by said first modem means;

re-creating with a synthesizer system located at the telephone company's central office virtual signatures corresponding of the test performed by said micro-tester at the remote location and transporting them to a test system at the telephone company's central office; and interconnecting all together a micro-controller, D/A circuit means, high voltage amplifier driver means, A/D attenuator means and A/D circuit means of said micro-tester for testing the line through said D/A circuit means and said high voltage amplifier driver means and for measuring the signatures of the test performed through said A/D attenuator and said A/D circuit means.

18. A telephone micro-tester and transport method as claimed in claim 17, wherein said D/A circuit means is coupled to said micro-controller and includes an operational amplifier buffer, an inverting operational amplifier, and a multiplexer for converting an 8-bit digital output signal from said micro-controller to a 10-bit output signal with polarity.

19. A telephone micro-tester and transport method as claimed in claim 18, wherein said A/D attenuator means is used for scaling down analog input signals for testing and said A/D circuit means serves to convert said analog signals to a 11-bit digital signal.

20. A telephone micro-tester and transport method as claimed in claim 19, wherein said high voltage amplifier driver means includes a low voltage amplifier, a level-shifting circuit, and transistor amplifiers all connected together to function as an operational transconductance amplifier.

21. A telephone micro-tester and transport method as claimed in claim 20, wherein each of said first and second modems is comprised of a fast train modem for establishing training between the telphone company and said micro-tester means located at the remote terminal.

22. A telephone micro-tester and transport method as claimed in claim 21, wherein said fast train modem includes a sub-audio channel operating in the 180–300 Hz range for controlling testing of said micro-tester means and for allowing voice communication with the customers whose lines are being tested.

23. A telephone micro-tester and transport method as claimed in claim 17, further comprising a relay matrix interconnected between said micro-tester means and said customer's lines so to allow said micro-tester to control testing selectively of one of many telephone lines.

24. A telephone micro-tester and transport method as claimed in claim 17, wherein said synthesizer means includes a second micro-controller, field programmable gate array means, D/A and A/d converters, sample and hold circuit means, first low pass filter means, high voltage amplifier driver means, voltage sensing circuit means, second low pass filter means, and track and hold circuit means all operatively interconnected together.

25. A telephone micro-tester system for testing smaller remote subscriber line carrier (SLC) customer's lines and equipment, said micro-tester system comprising:

micro-tester means located at a remote terminal for measuring and storing signatures of test performed on the SLC customer's lines and terminal equipment to determine faults;

said micro-tester means including a micro-controller, D/A circuit means, high voltage amplifier driver means, A/D attenuator means, and A/D circuit means all connected together for testing the line through said D/A circuit means and said high voltage amplifier driver means and for measuring the signatures for the test performed through said A/D attenuator means and said A/D circuit means;

said D/A circuit means being coupled to said micro-controller and including an operational amplifier buffer, an inverting operational amplifier, and a multiplexer for converting an 8-bit digital output signal from said micro-controller to a 10-bit output signal with polarity;

said A/D attenuator means being used for scaling down analog input signals for testing and said A/D circuit-means serving to convert said analog signals to a 11-bit digital signal; and said high voltage amplifier driver means including a low voltage amplifier, a level-shifting circuit, and transistor amplifiers all connected to function as an operational transconductance amplifier.

* * * * *